US012192018B1

(12) United States Patent
Roper

(10) Patent No.: US 12,192,018 B1
(45) Date of Patent: Jan. 7, 2025

(54) MULTI-MEETING MODE FOR VIRTUAL MEETINGS

(71) Applicant: Zoom Video Communications, Inc., San Jose, CA (US)

(72) Inventor: Brandon Kevin Roper, Washington, UT (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 18/143,774

(22) Filed: May 5, 2023

Related U.S. Application Data

(63) Continuation of application No. 17/871,070, filed on Jul. 22, 2022, now abandoned.

(51) Int. Cl.
*H04L 12/18* (2006.01)
*G10L 15/08* (2006.01)
*G10L 15/22* (2006.01)

(52) U.S. Cl.
CPC .......... *H04L 12/1822* (2013.01); *G10L 15/08* (2013.01); *G10L 15/22* (2013.01); *H04L 12/1818* (2013.01); *G10L 2015/088* (2013.01)

(58) Field of Classification Search
None
See application file for complete search history.

(56) References Cited

U.S. PATENT DOCUMENTS

| 11,539,920 | B1* | 12/2022 | Stonehocker | G06F 3/167 |
| 2018/0375676 | A1* | 12/2018 | Bader-Natal | G06F 3/0481 |
| 2020/0313918 | A1* | 10/2020 | VanBlon | H04L 65/403 |
| 2021/0258427 | A1* | 8/2021 | Lee | H04L 12/1831 |
| 2022/0109707 | A1* | 4/2022 | Butterfield | G06Q 10/103 |
| 2022/0271962 | A1* | 8/2022 | Patel | G06F 3/167 |
| 2022/0394067 | A1* | 12/2022 | Mathihalli | H04L 65/1069 |

FOREIGN PATENT DOCUMENTS

CA 3090676 A1 * 2/2021 ......... G06Q 10/1095

* cited by examiner

Primary Examiner — Phyllis A Book
(74) Attorney, Agent, or Firm — Kilpatrick Townsend & Stockton LLP

(57) ABSTRACT

Systems and methods for providing multi-meeting modes for virtual meetings are provided. In aspects, a system including a non-transitory computer-readable medium, a communications interface, and a processor is provided. The processor may be configured to execute instructions to establish a first virtual meeting and establish a second virtual meeting. The second virtual meeting may run concurrent with the first virtual meeting. The instructions may further cause the processor to receive, from a first client device, a first request to join the first virtual meeting and a second request to join the second virtual meeting, and transmit to the first client device: a first set of multimedia streams and a second set of multimedia streams. The instructions may further cause the processor to determine a primary virtual meeting and modify one of the first set of multimedia streams or the second set of multimedia streams based on the primary virtual meeting.

22 Claims, 11 Drawing Sheets

MULTI-MEETING MODE FOR VIRTUAL MEETINGS

CROSS-REFERENCE

This application is a continuation of U.S. patent application Ser. No. 17/871,070, filed Jul. 22, 2022, titled "Multi-Meeting Mode for Virtual Meetings," the entirety of which is hereby incorporated by reference.

FIELD

The present application generally relates to videoconferences and more particularly relates to systems and methods for providing a multi-meeting mode for virtual meeting participants. Specifically, the present application provides systems and methods for allowing a virtual meeting participant to attend more than one virtual meeting simultaneously.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
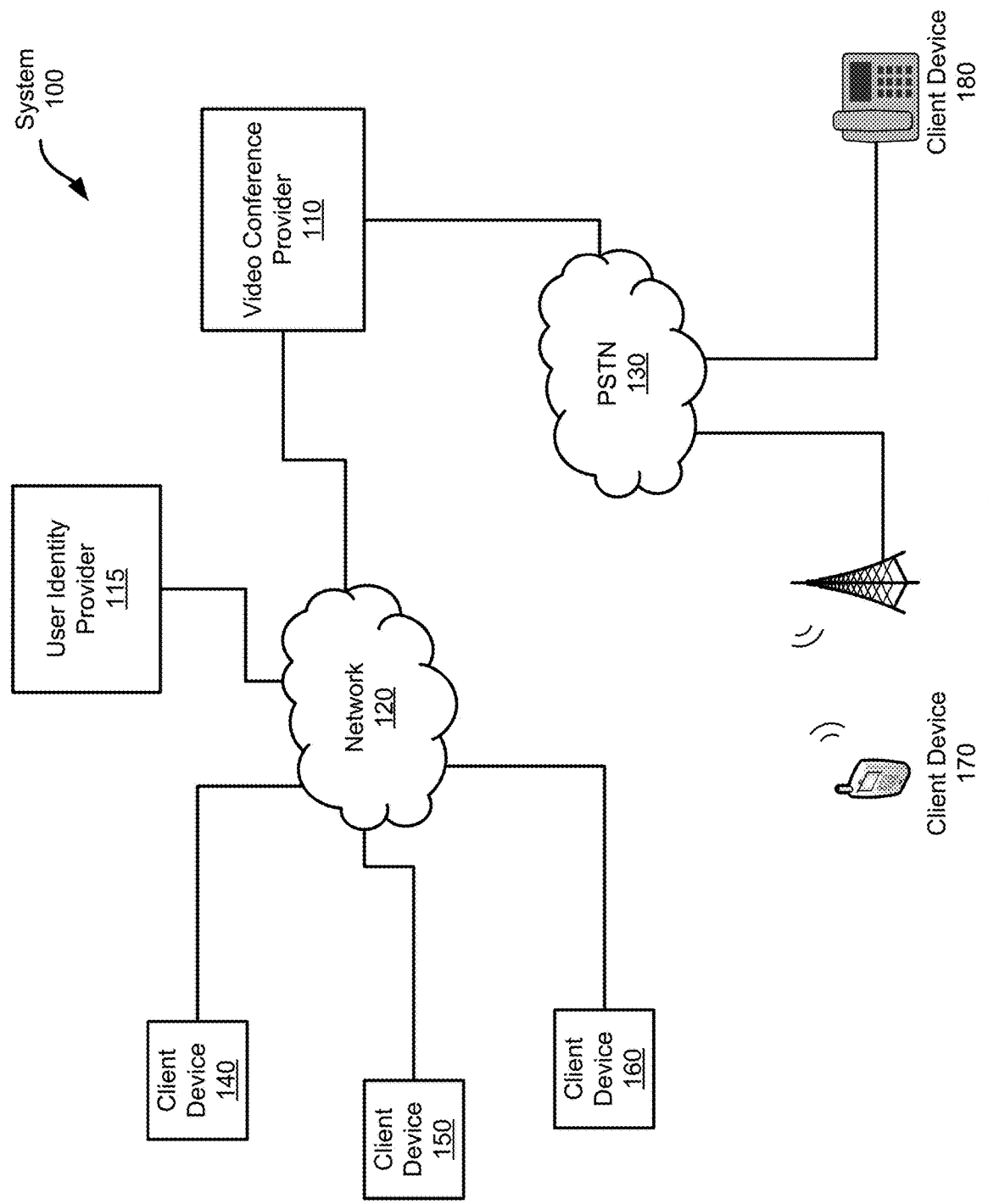
FIGS. 1, 2, and 3A-3B show example systems for providing a multi-meeting mode for virtual meetings, according to an embodiment herein.

Examples are described herein in the context of systems and methods for providing a multi-meeting mode for virtual meetings. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Video conference providers can enable people to interact with each other using their own computers (or "client devices") with both video and audio in a variety of settings, such as in one-on-one conversations, group meetings, and webinars. While each of these types of settings can allow people to interact with each other, they can differ in character. For example, one-on-one conversations include only two people and may involve only a small amount of data being transmitted between the two client devices. Group meetings may involve a larger number of people all interacting with each other. In contrast, webinars typically involve a group of people that are attending to hear presentations from one or more presenters. Thus, in a webinar, interaction tends to be mostly one-way: from the presenter(s) to the audience. In addition, webinars can have very large numbers of participants, potentially numbering in the thousands or tens of thousands.

As the popularity of virtual meetings to replace conventional, in-person meetings, continues to rise, so too does the prevalence of over-booked schedules or double booking time slots on an individual's calendar. For example, many people's schedules are fully booked and it is not uncommon for people to be double booked to attend two different virtual meetings at the same time. This is particularly true for executives or top end professionals.

Currently, when a participant is booked for two different virtual meetings at the same time the participant must choose which of the virtual meetings to attend. In other words, the participant can only attend one virtual meeting at a time. Because the participant is limited to only attending one virtual meeting at a time, the participant may miss relevant content and miss the chance to interact with people within the unattended virtual meeting. Additionally, the missed meeting may be negatively impacted by the participant's absence. For example, the participant's input may not be collected on important matters, thereby forcing the unattended meeting to be rescheduled. This may waste the time of participants who did attend the unattended meeting.

To allow participants to attend more than one virtual meeting simultaneously, multi-meeting modes are provided herein. A multi-meeting mode may allow a participant to attend two separate virtual meetings on a single device. The participant can choose which meetings to attend and the client device can create two or more different meeting instances with the participant admitted to each virtual meeting. Each of the meeting instances may function and be treated by the client device as a distinct virtual meeting. For example, each of the meetings may have its own settings and restrictions. The multi-meeting participant may control the audio and/or transcripts for each meeting as if each of the meetings were a stand-alone meeting. For example, the participant may set the first meeting to audio while setting the second meeting to transcript only.

In some embodiments, the two meetings may have differing transparencies for participant attendance. That is, the first meeting may know that the multi-meeting participant is attending the second meeting, while the second meeting may be unaware that the multi-meeting participant is attending another meeting. The multi-meeting participant may control his or her transparency in a meeting, but the feature may be ultimately allowed or disallowed by the meeting host of a given meeting.

While people can currently attend multiple separate virtual meetings by utilizing separate client devices, the present multi-meeting mode allows participants to attend multiple separate meetings simultaneously using a single client device. By joining a participant to multiple separate meetings via a single client device and/or via a single instance of the virtual meeting application, the multiple meeting instances may be connected and share backend communications. This can provide fluidity for the participant when transitioning between the multiple virtual meetings. Moreover, the connection between the separate virtual meetings can allow adaptive attention control for the participant based on content within each of the virtual meetings.

To provide adaptive attention control for the participant, multi-meeting modes are provided herein. Multi-meeting modes may provide attention assistance to the participant when in two virtual meetings to facilitate how the participant focuses his or her attention. For example, one issue that can arise from participating in two different meetings simultaneously is missing an attention cue, such as a direct question or a topic of interest. As noted above, virtual meetings can last for long durations and participants can become inattentive, especially participants who are in two meetings simultaneously. For example, during the first meeting the presenter may direct a question to the multi-meeting participant and unless the multi-meeting participant is closely paying attention to the first meeting, the multi-meeting participant may miss the question. Similarly, a multi-meeting participant may miss a topic of interest by participating in a second meeting. For example, during a first meeting covering numerous presentation topics, a multi-meeting participant may engage in the second meeting during irrelevant topics. But unless the participant is paying close attention, the multi-meeting participant may miss a change to a topic of interest in the first meeting.

To allow participants to engage in a second meeting without missing attention cues from the first meeting (and vice versa), an attention assistant may monitor the first meeting for the attention cue. In some embodiments, the attention assistant may monitor the first meeting for a keyword or phrase specific to a multi-meeting participant. For example, the attention assistant may monitor the first meeting for the name of the multi-meeting participant, a topic of interest, or content that may be relevant to the participant. In other embodiments, the attention assistant may monitor the second meeting for content relevant to the multi-meeting participant (e.g., his or her name, topic of interest, or keywords specific to the multi-meeting participant).

In some embodiments, the attention assistant may also monitor which meeting the multi-meeting participant is actively participating in. For example, a camera of the client device for the multi-meeting participant may monitor which meeting instance the multi-meeting participant is looking at and automatically adjust the microphone and/or speakers to that meeting. In some cases, the attention assistant may also mute or modify the audio of the meeting that he or she is not actively participating in ("non-active meeting").

When the attention assistant identifies an attention cue for a multi-meeting participant, the attention assistant may alert the multi-meeting participant. For example, when an attention cue is identified, the multi-meeting participant may be prompted by a visual or audible alert. Upon the alert, the multi-meeting participant can switch his or her attention to the relevant meeting, as desired. In some embodiments, the attention assistant may automatically switch between meeting instances to direct the multi-meeting participant's attention to the relevant content.

Another issue that may arise from attending two or more meetings simultaneously is the multi-meeting participant may appear absent from the non-active meeting while engaging in the other meeting. To prevent the multi-meeting participant from appearing absent in the non-active meeting, adjustments may be made to the multi-meeting participant's presence within the non-active meeting. For example, if the multi-meeting participant is speaking in the first meeting, then the multi-meeting participant's video stream in the second meeting may be paused and/or his or her audio stream may be muted. If the multi-meeting participant is addressed in the non-active meeting while the multi-meeting participant is active in another meeting, a prompt may be provided in the non-active meeting indicating that the multi-meeting participant has stepped away and may return shortly.

In some embodiments, the multi-meeting participant and/or the meeting hosts for each of the meetings may be able to join one or more Examples of the meetings together. For example, if allowed by the hosts, the multi-meeting participant may join the first meeting and the second meeting together. In another example, the multi-meeting participant may be able to start a chat channel between participants in each of the meetings. That is, the multi-meeting participant may be able to start a chat channel with a participant from the first meeting and a participant from the second meeting. In still another example, if there are multiple multi-meeting participants all attending the same two or more meetings, the multi-meeting participants may be able to start a chat channel between themselves to privately discuss the state and subject matter of each meeting.

This illustrative example is given to introduce the reader to the general subject matter discussed herein and the disclosure is not limited to this example. The following sections describe various additional non-limiting examples and examples of systems and methods for providing a multi-meeting mode during virtual meetings. Additional non-limiting examples may include examples of systems and methods for providing an attention assistant functionality during the multi-meeting mode.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
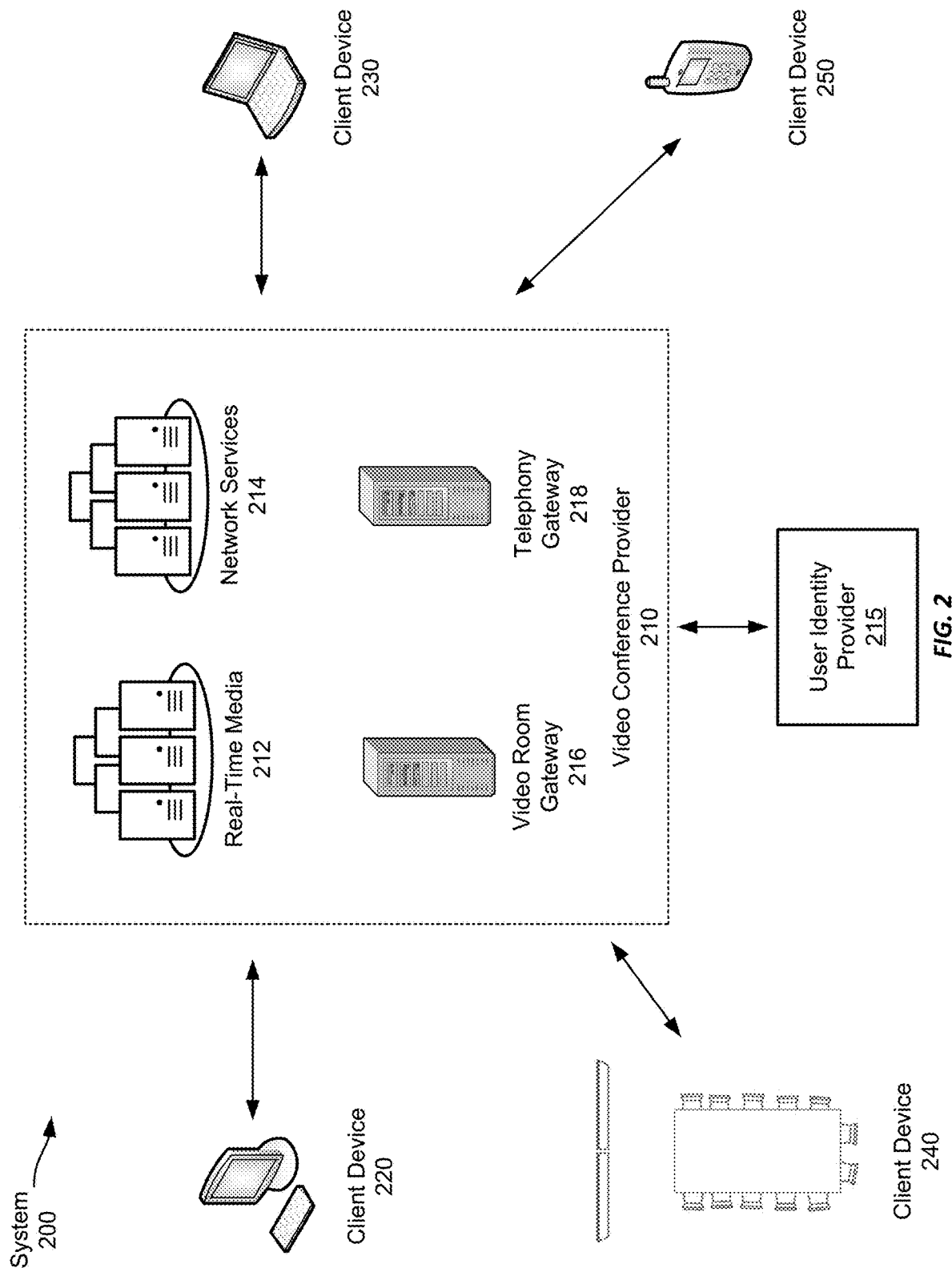

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the first meeting, etc. FIG. 2, described below, provides a more detailed description of the architecture and functionality of the video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode. As discussed in detail below, in some embodiments, a first virtual meeting may terminate, thereby disconnecting only participants in that sidebar meeting. The first meeting may continue allowing participants therein to continue exchanging audio and video streams.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can making conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including keypair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different Examples of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a second meeting, such a command may also be handled by a network services server 214, which may terminate the authorization of the one or more participants for joining the sidebar meeting. In some embodiments, the host may wish to join one or more participants in a second meeting. The command to do so may be handled by a network services server 214, which may provide authorization information to the one or more participants to join the sidebar meeting and then connect the one or more participants to the sidebar meeting similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3A:
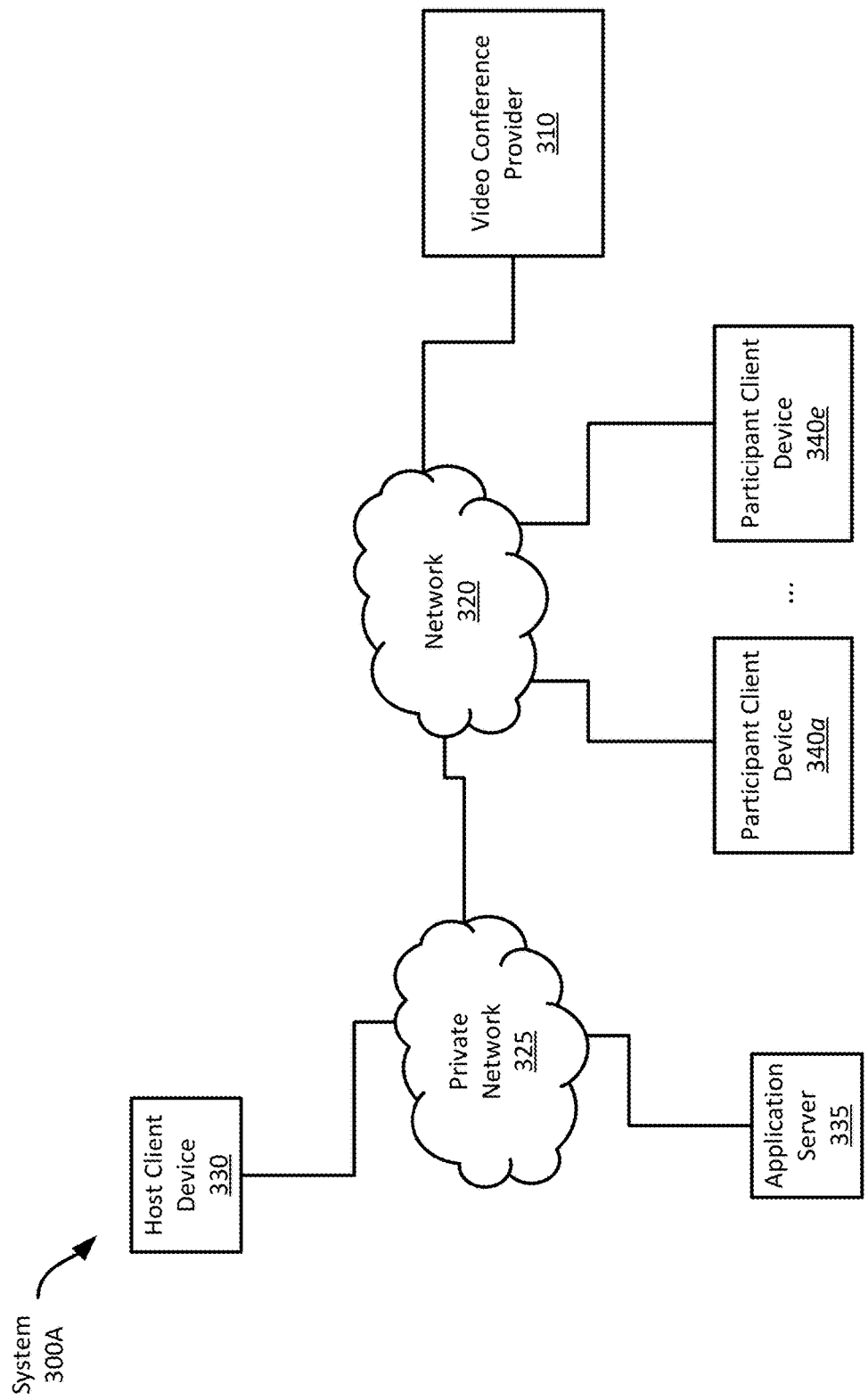

Referring now to FIG. 3A, FIG. 3A shows an example system 300 for providing a multi-meeting mode during virtual meetings. In this example, a video conference provider 310 provides video conference services to multiple different client devices 330 and 340a-m, generally as described above with respect to FIGS. 1 and 2. In this example, the client devices 330 and 340a-e participate in a meeting hosted by the video conference provider 310. Client devices 340a-e connect to the video conference provider 310 over a public network 320, e.g., the internet; however, host client device 330 participates from within a private network 325, such as from their office at work. In addition to the host client device 330, an application server 335 is connected to the private network and makes various business applications available to the host client device 330. In different examples, these business applications may vary; however, in this example, the application server 335 provides applications to access business databases and files. To access these various resources, the host client device 330 has different client applications installed on it and may also have web applications accessible via a web browser, which may be stored as bookmarks in the web browser.

To start a meeting, the host client device 330 connects to the video conference provider 310 and begins a first meeting at the video conference provider 310, such as by beginning a scheduled meeting, generally as described above with respect to FIGS. 1 and 2. The video conference provider 310 may create and manage the meeting as discussed above.

Once the first meeting is started, participants may be able to interact with other participants and see their respective names, such as in close proximity to other participants' video streams or in a list of participants visible in a graphical user interface ("GUI"). In some embodiments, the participants may only be able to see information, e.g., names or video feeds, from the host(s) of the webinar or certain select participants that will be engaged in discussions during the first meeting, such as panelists in a panel discussion. Still other limits may be imposed on the various participants, such as their ability to react to occurrences during the meeting, e.g., participants may be allowed to interact with their GUI to raise their hand to ask a question, but may not be allowed to provide any other feedback.

Figure 3B:
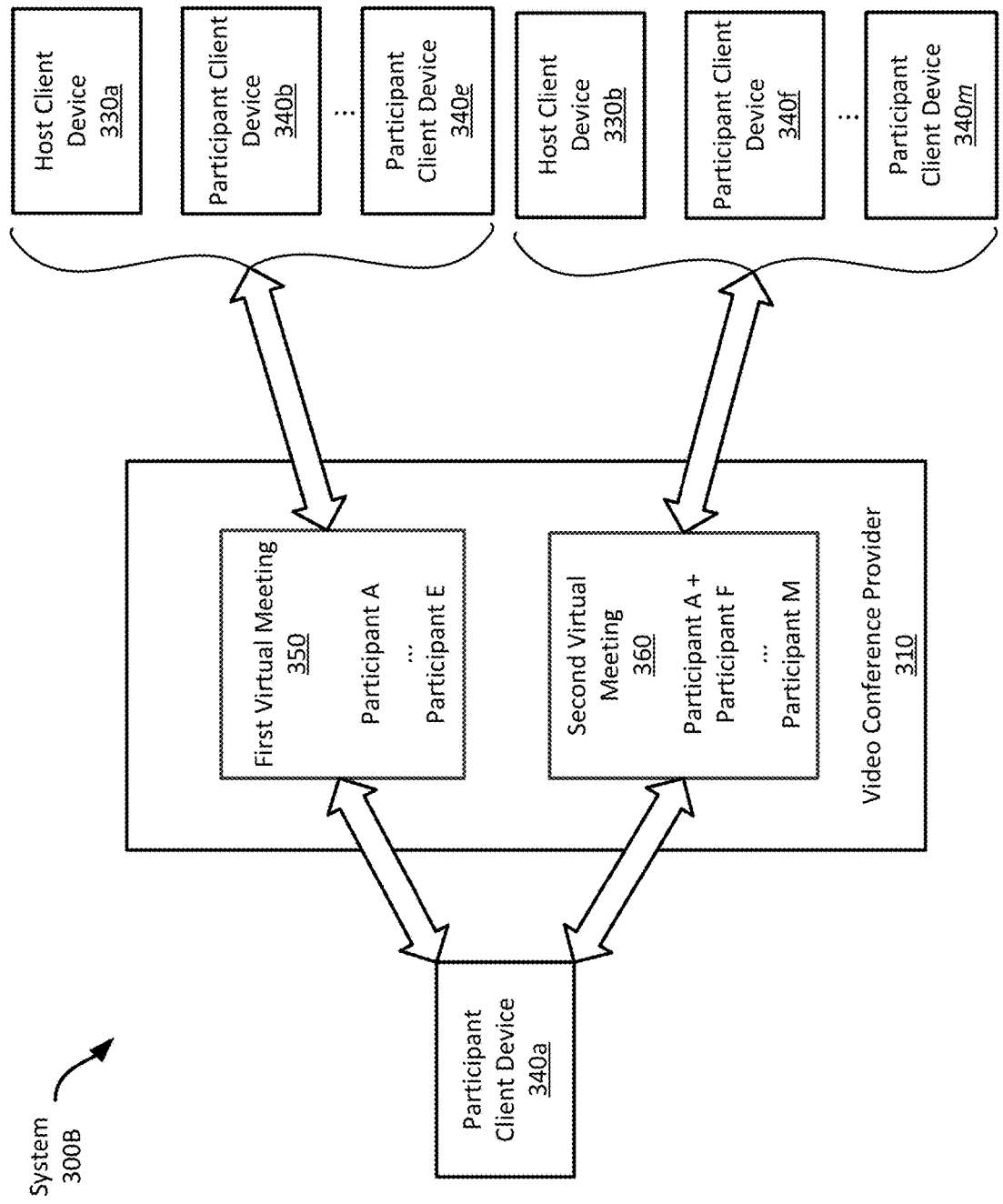

During the first meeting, the participant associated with the client device 340a (participant A) may wish to attend or be scheduled to attend a second meeting. The second meeting may be initiated via a process that is similar to the first meeting. Referring now to FIG. 3B, a system 300B for providing a multi-meeting mode including a first meeting 350 and a second meeting 360 is provided, according to an embodiment herein. The video conference provider 310 may establish a first meeting 350, which hosts a first set of participants A-E associated with the client devices 340a-e, as described with respect to FIG. 3A. The first meeting 350 may be hosted by a first host client device 330a.

During the first meeting 350, the participants A-E may receive audio and video streams exchanged during the first meeting 350. For example, if the first host client device 330a is presenting on a topic, the audio and video streams from the first host client device 330a may be received by the client devices 340a-e. The first meeting 350 may be an interactive virtual space where the participants A-E can also contribute to the first meeting 350. As such, audio and video streams from the client devices 340a-e may also be exchanged during the first meeting 350.

The second meeting 360 may be established in a similar manner as the first meeting 350. For example, the video conference provider 310 may establish the second meeting 360, which hosts a second set of participants F-M associated with the client devices 340f-m, thereby allowing the client devices 340f-m to exchange audio and video streams during the second meeting 360. The second meeting 360 may be hosted by a second host client device 330b. In some embodiments, the second host client device 330b may be different from the first host client device 330a, thus the first and second meetings 350 and 360 are hosted by separate hosts. It should be appreciated that while the following discussion describes the second meeting 360 being established via launching a second copy of a virtual meeting application that other configurations are contemplated herein. For example, the second meeting 360 may be established via the same copy of the virtual meeting application as the first meeting 350.

During the second meeting 360, the participants A and F-M may receive audio and video streams exchanged during the second meeting 360. For example, if the second host client device 330b is presenting on a topic, the audio and video streams from the second host client device 330b may be received by the client devices 340a and 340f-m. The participant A associated with the client device 340a may also be attending the second meeting 360. As such, the client device 340a may receive the audio and video streams exchanged during both the first meeting 350 and the second meeting 360. The second meeting 350 may be an interactive virtual space where the participants A and F-M can also contribute to the second meeting 360.

One or both of the first meeting 350 and the second meeting 360 may be considered a virtual "room" in which participants A-E of the first meeting 350 can meet and communicate or the participants A and F-M of the second meeting 360 can meet and communicate. In some embodiments, the first meeting 350 and/or the second meeting 360 may be a hybrid meeting in which one or more participants attend the meeting in person and one or more participants virtually join. For example, the first meeting 350 and/or the second meeting 360 may be a physical, in-person meeting in which one or more participants join virtually. Participants of the first meeting 350 and the second meeting 360 may have various types of roles. For example, there may be one or more host role(s) (e.g., the participant corresponding to the first host client device 330a or the second host client device 330b) and one or more attendee role(s) (e.g., participants corresponding to client devices 340a-340m).

Depending on the role of a particular participant in the first meeting, various restrictions may apply. A host may have little to no restrictions. The level of restrictions for a host role may be set by the video conference provider 310 or by the host. In cases where there is a co-host or more than one host role, hosts may have varying levels of restrictions. For example, a main host (e.g., the host who arranged the first meeting 350) may be running late and assign another participant the role of co-host to begin the first meeting 350 on time. The main host may also assign various restrictions to the co-host, such as not allowing the co-host to change the roles of other participants.

The host (or co-host) may also be able to authorize the ability for the participant A to attend the first meeting 350 while attending another simultaneous meeting. For example, the host may allow the participant A to join the first meeting 350 when attending the second meeting 360. If the host does not allow the participant A to join the first meeting 350 when already attending another meeting, then the participant A may receive a notification that dual attendance is not allowed. In contrast, if the participant A joins the first meeting 350 first and then subsequently joins the second meeting 360, the host may receive an indication when participant A joins the second meeting 360. Again, if the first meeting 350 does not allow dual attendance, then the participant A may receive such a notification. In contrast, if the first meeting 350 does allow dual attendance, then the host may be notified of the participant A's dual attendance to help facilitate the participant A's attendance within the first meeting 350. For example, if the host is aware that the participant A may be jumping between the first meeting 350 and the second meeting 360, the host may be able to monitor for when the participant A is focused on the second meeting 360 and not available for interaction during the first meeting 350. In another example, the host may be able to cover for the participant A when the participant A is focused on the second meeting 360.

When the participant A is attending more than one meeting (e.g., the first meeting 350 and the second meeting 360), one of the meetings may be selected as a primary meeting. When selected as a primary meeting, one or more multimedia streams corresponding to that meeting may be modified based on the selection. For example, if the first meeting 350 is selected as the primary meeting, then the participant A's video stream may be transmitting to the other participant client devices 340b-e and host client device 330a of the first meeting 350. In contrast, to prevent confusion in the second meeting 360, the video stream from the participant client device 340a may be paused or terminated so that video of the participant A in the first meeting 350 is not transmitted during the second meeting 360. Other modifications are described in greater detail below with respect to FIGS. 4-6.

In some embodiments, the volumes of the audio streams for the first meeting 350 and the second meeting 360 may be modified based on selection of the primary meeting. For example, if the first meeting 350 is selected as the primary meeting, then the volume for the audio stream corresponding to the first meeting 350 may be increased while the volume for the audio stream corresponding to the second meeting 360 may be decreased. In some cases, the audio stream for the second meeting 360 may be completely muted. In some embodiments, one or both of the audio streams from a given meeting may be transcribed so that the participant A can either read the transcription of both meetings or read the transcription of one meeting while listening to the other meeting. In other embodiments, the audio stream from the first meeting 350 may be played through one side of the participant client device's 340a sound system (e.g., right-side headphone) while the audio stream from the second meeting 360 may be played through a second side of the participant client device's 340a sound system (e.g., left-side headphone). Those skilled in the art will readily appreciate the various arrangements that could be made with the audio streams from the first meeting 350 and the second meeting 360.

As noted above, in some embodiments, the participant A may select the primary meeting, such as selecting the first meeting 350 to be the primary meeting. The primary meeting may be the meeting for which the participant A directs his or her focus. For example, to direct the participant A's focus, the participant A may arrange a display for the first meeting 350 larger than the display for the second meeting 360, the participant A may be interacting with the first meeting 350, or the participant A may increase the volume of the first meeting 350. Various other interactions with the first meeting 350 and the second meeting 360 are described below with reference to FIGS. 4-6 for how the participant A may direct his or her focus and determine a primary meeting.

In some embodiments, the video conference provider 310 may determine the primary meeting. For example, the video conference provider 310 may determine the primary meeting based on input from the participant client device 340a. The video conference provider 310 may monitor one or more multimedia streams received from the client device 340a to determine to which meeting the participant A's attention is directed. For example, the video conference provider 310 may monitor an audio stream received from the client device 340a to determine which meeting the participant A is interacting with. If the video conference provider 310 detects that the participant A is speaking in the first meeting 350, then the video conference provider 310 may determine that the first meeting 350 is the primary meeting. Similarly, the video conference provider 310 may monitor a video stream received from the participant client device 340a to determine which meeting the participant A is focused on. For example, the video conference provider 310 may use one or more eye tracking techniques to determine which meeting the participant A is watching and based on that determine the primary meeting.

In some embodiments, the video conference provider 310 may use an attention assistant to determine the primary meeting based on content within a meeting. In other words, the video conference provider 310 may monitor the multimedia streams exchanged during a given meeting to determine if any content of interest to the participant A is being exchanged. For example, the video conference provider 310 may monitor the audio and/or video streams during the first meeting 350 to determine if an attention cue for the participant A is exchanged. An attention cue for the participant A may include content that is relevant to the participant A, such as for example, the participant A's name, company name, job title, projects that the participant A is involved in, or other topics that relate to the participant A. If the video conference provider 310 determines an attention cue is being exchanged in the first meeting 350, the video conference provider 310 may alert the participant A of the attention cue or determine the first meeting 350 to be the primary meeting. The attention cue determination and techniques are described in greater detail below with respect to FIGS. 5 and 6.

Once a primary meeting is determined, the corresponding display and/or audio streams may be adjusted accordingly. If the first meeting 350 is determined to be the primary meeting, then the display for the first meeting 350 may be rearranged to be the primary focus on the participant client device 340a and/or a volume for the audio stream corresponding to the first meeting 350 may be adjusted to be the primary audio stream. In some embodiments, in conjunction with modifying the first meeting 350 display and/or audio, or in place of modifying the first meeting 350, the display and/or audio for the second meeting 360 may be adjusted. For example, the display for the second meeting 360 may be modified to be out of focus or lower priority on the participant client device 340a, and/or a volume corresponding to the audio stream for the second meeting 360 may be reduced or even muted. In some embodiments, if the audio stream of the non-primary meeting (the second meeting 360 in this example) is muted, then the audio streams for the non-primary meeting may be automatically transcribed and a transcription may be provided on the second meeting 360 display.

At some point during the meeting, the participant A may switch between meetings. For example, the participant A may receive an attention cue from the video conference provider 310 or identify content in the second meeting 360 requiring his or her attention. To switch between meetings, the participant A may select the display for the second meeting 360 or the video conference provider 310 may automatically transition the participant A to the second meeting 360 based on the attention cue. When the participant transitions to the second meeting 360, the second meeting 360 may become the primary meeting and the first meeting 350 may become the non-primary meeting. As such, the audio and video properties of the first meeting 350 and the second meeting 360 may be modified, as described above.

It should be appreciated that the participant A may attend more than one additional meetings during the first meeting 350. Any number of secondary may be attended by the participant A and more than one participant can attend multiple meetings at a time. For example, any one of participants B-M may also be attending both the first meeting 350 and the second meeting 360. In other words, the multi-meeting modes described herein can facilitate attendance of two or more, three or more, four or more, or five or more virtual meetings simultaneously. Moreover, dual attendance participants, such as the participant A, may join and leave either or both of the first meeting 350 and the second meeting 360 at any time as is the case with a conventional virtual meeting.

Figure 4:
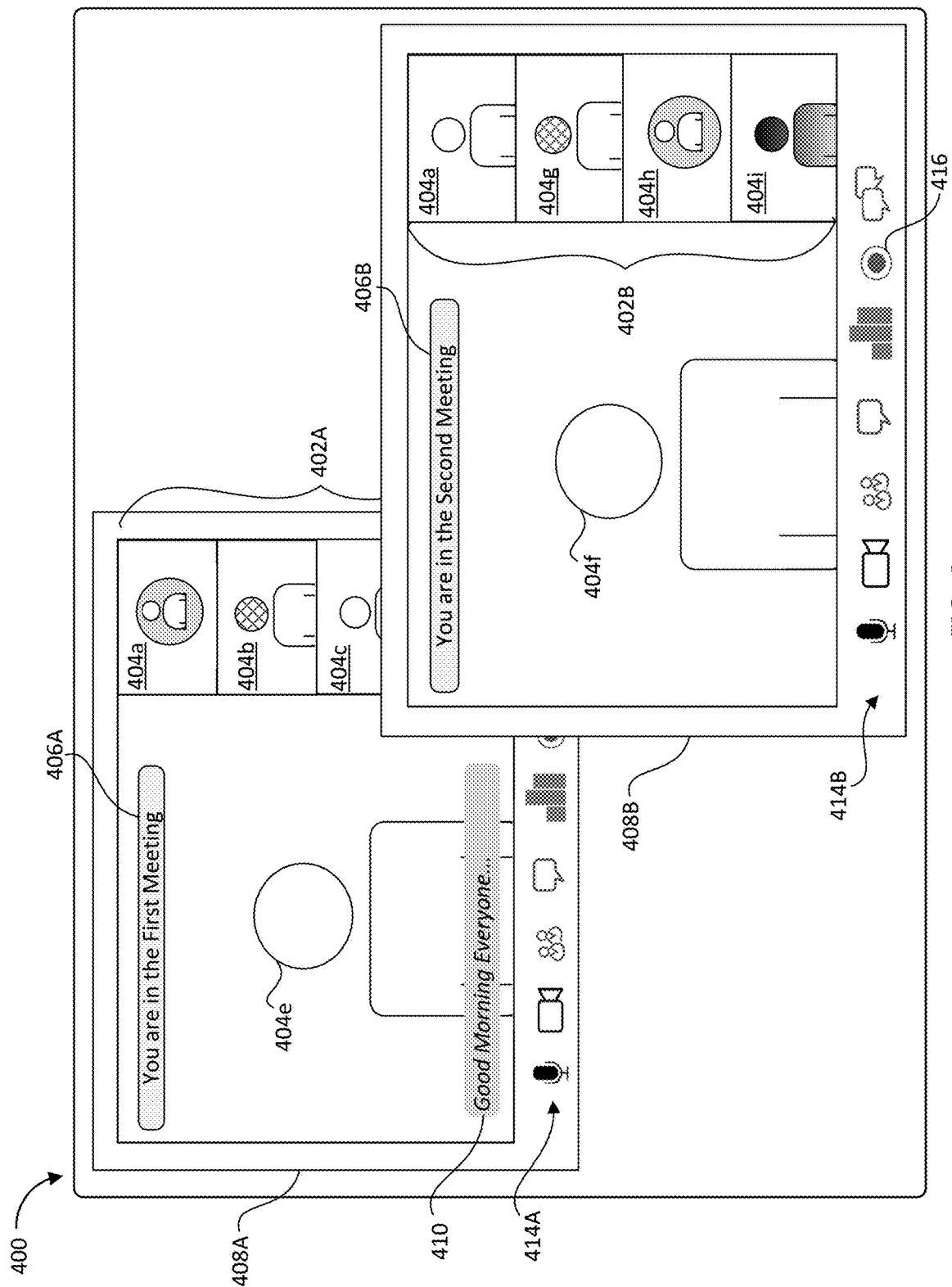
FIG. 4 illustrates a graphical user interface providing a multi-meeting mode for a virtual meeting participant, according to an embodiment herein.

Referring now to FIG. 4, FIG. 4 illustrates a GUI 400 providing a multi-meeting mode for a virtual meeting participant, according to an embodiment. The GUI 400 may be presented to a participant or a host when attending more than one meeting, such as the participant A attending the first meeting 350 and the second meeting 360. The following figures and related components, such as GUI 400 of FIG. 4, will be described with respect to systems shown in FIGS. 3A and 3B, however, any suitable system according to this disclosure may be employed, such as those described in FIGS. 1 and 2.

In some embodiments, a GUI 400 is viewable to a participant of the virtual meeting on the participant's device, for example the GUI 400 may be viewable to a multi-meeting participant 404a (e.g., participant A) on the client device 340a. Presentation of the GUI 400 on the participant's device may be in response to the initiation of one or more virtual meetings, such as the first meeting 350 and/or the second meeting 360.

As shown, the GUI 400 may include a first display 408A and a second display 408B. The first display 408A may correspond to a first meeting, such as the first meeting 350 and the second display 408B may correspond to a second meeting, such as the second meeting 360. In the example illustrated in FIG. 4, the second meeting 360 may be the primary meeting and as such, the display 408B may be arranged to be the primary focus on the GUI 400. The display 408B may be the primary focus on the GUI 400 in that it is larger than the display 408A and arranged to overlay the display 408A. Other arrangements of the display 408A and the display 408B may be present to achieve primary focus on the GUI 400.

Each of the displays 408A and 408B may include a roster 402A and 402B, respectively, of the participants in the virtual meeting. For example, the roster 402A may include participants 404a-e who are attending the first meeting 350 and the roster 402B may include participants 404a and 404f-m who are attending the second meeting 360. The participants 404a-e may correspond to the participant client devices 340a-e and the participants 404f-m may correspond to the client devices 340f-m from FIG. 3B.

The rosters 402A and 402B may include a video stream of some or all of the participants 404a-m. In other embodiments, the rosters 402A and 402B may include a picture, image, representation, avatar or a listing of some or all of the participants 404a-e who have joined the first meeting. When a participant joins a given virtual meeting, the joining participant is added to the respective roster. For example, if a participant joins the first meeting 350 then the participant may be joined to the roster 402A.

Once the first meeting 350 is initiated, video and audio streams may be exchanged between the participants 404*a-e*. The display 408A may display the video stream of a currently speaking participant 404*e*. The audio stream from participant 404*e* may also be transmitted along with the display 408A. In some embodiments, more than one participant may be speaking, and in such cases, display 408A may include two or more windows providing the video streams from the speaking participants.

Similarly, once the second meeting 360 is initiated, video and audio streams may be exchanged between the participants 404*a* and 404*f-m*. The display 408B may display the video stream of a currently speaking participant 404*f*. The audio stream from participant 404*f* may also be transmitted along with the display 408B. In some embodiments, more than one participant may be speaking, and in such cases, display 408B may include two or more windows providing the video streams from the speaking participants.

To indicate to the multi-meeting participant 404*a* (e.g., the participant A) which display 408A and 408B corresponds to which meeting, indications 406A and 406B may be provided. For example, as illustrated, the indications 406A and 406B may notify or otherwise indicate that the multi-meeting participant 404*a* is attending the second meeting 360 as the primary meeting. In some embodiments, instead of a banner, like the indication 406A, the background of the display 408A may change colors, highlight, pulse, or toggle in size to indicate that the participant 404*a* is not in the first meeting. The indication 406A and the indication 406B may be helpful for the multi-meeting participant 404*a* to know which meeting his or her audio and video streams are being transmitted to or which meeting is selected as the primary meeting. If the multi-meeting participant 404*a* is constantly switching between and engaging in the first meeting 350 and the second meeting 360, the multi-meeting participant 404*a* could easily become confused as to which virtual meeting space he or she is in and accidently say or share something in the first meeting 350 meant for the second meeting 360.

Each of the displays 408A and 408B may include a dashboard 414A and 414B, respectively, containing one or more action selections. For example, the dashboard 414B may include a recording selection 416 that allows a participant to record the streams of audio and video during the video conference. In some embodiments, the dashboards 414A and 414B may include other selections such as a chat selection, a polling selection, and the like.

While in the first meeting 350 and the second meeting 360, the participant 404*a* may receive two audio streams: one from the first meeting 350 and one from the second meeting 360. Upon entry into the second meeting 360, the client device 340*a* of the multi-meeting participant (e.g., participant 404*a*) may be configured to target and provide audio from the second meeting 360 (the primary meeting) over the audio from the first meeting 350 (the non-primary meeting), since the sounds from the two virtual meeting rooms would likely overlap, be difficult to understand, and may lack saliency if they were output to the client device at the same time.

To prevent the multi-meeting participant 404*a* from receiving the two audio streams at full volume at the same time, the multi-meeting participant 404*a* can adjust the volume of audio streams from the first meeting 350 to a background level while the audio streams from the second meeting 360 remains at a normal audio level. In some cases, the audio level of each respective audio stream may be automatically adjusted upon selection of the primary meeting. For example, upon selection of the second meeting 360 as the primary meeting, the audio from the first meeting 350 may be muted and the audio from the second meeting 360 may be provided at a normal level. The multi-meeting participant 404*a* may have the option to receive audio streams from both the first meeting 350 and the second meeting 360, such as by reducing the volume of one of the two audio streams, or by playing each audio stream from a different audio output device, e.g., the first meeting 350 audio is played from the left speaker and the second meeting 360 audio is played from the right speaker.

It should be appreciated that in some embodiments, the GUI 400 may be of a single virtual meeting application in which the displays 408A and 408B for the separate virtual meetings are provided. That is, in these embodiments, the multiple meetings are established via a single instance of the virtual meeting application. In other embodiments, the GUI 400 may be a display on the client device 340*a* and the displays 408A and 408B may correspond to separate instances of a virtual meeting application. That is, each virtual meeting is established via a separate virtual meeting application.

Figure 5:
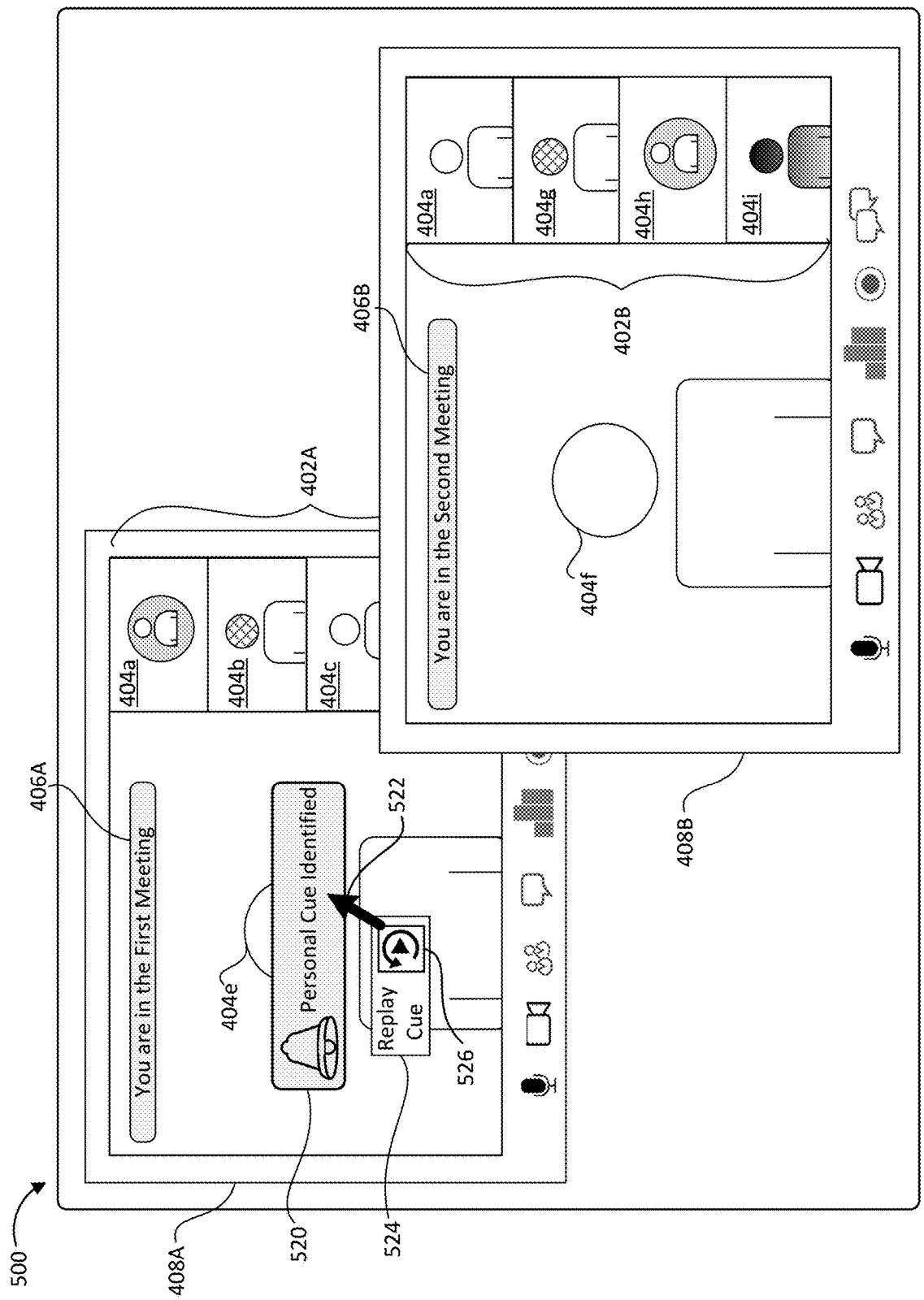
FIG. 5 illustrates an example notification displayed to a participant during multi-meeting mode, according to an embodiment herein.
Figure 6:
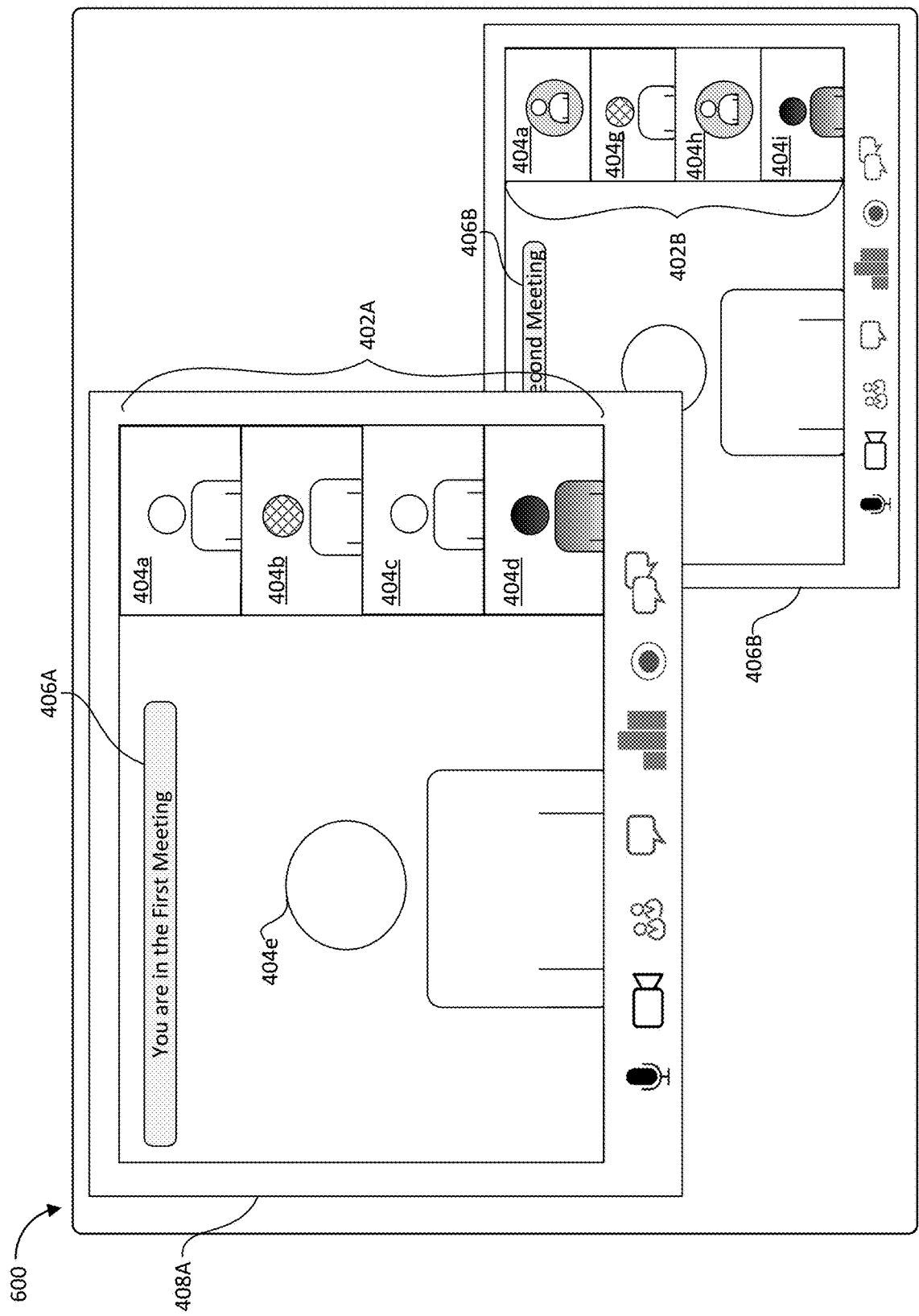
FIG. 6 illustrates a transition between primary meetings during multi-meeting mode, according to an embodiment herein.

As will be described in greater detail below with respect to FIGS. 5 and 6, if the multi-meeting participant 404*a* receives a notification of an attention cue for the first meeting 350, the multi-meeting participant 404*a* can mute the audio streams from the second meeting 360 and increase the volume of the audio streams from the first meeting 350. The multi-meeting participant may listen in on the first meeting 350 to determine whether he or she should switch from the second meeting 360 to the first meeting 350, or should leave the second meeting 360 to focus solely on the first meeting 350.

As shown, the display 408A may include a transcription 410 of the audio streams exchanged during the first meeting 350. In some embodiments, instead of transmitting the audio streams for the non-primary meeting (here the first virtual meeting 350), the transcription 410 of the audio streams may be provided on the display 408A. In some cases, the audio streams from the non-primary meeting may be provided along with the transcription 410, however, the audio streams from the first meeting 350 may be lowered to allow the audio streams from the primary meeting (the second virtual meeting 360) to be the focus of the multi-meeting participant's 404*a* audio. As such, the transcription 410 may be provided to allow the multi-meeting participant 404*a* to have context for content of the first meeting 350 at a glance.

Once the primary meeting is selected, the representation of the multi-meeting participant 404*a* as part of the roster 402A and 402B may change. For example, when the second meeting 360 is selected as the primary meeting, if the multi-meeting participant 404*a*'s representation in the roster 402A remains as a current video stream from the client device 340*a*, it could be confusing to participants 504*b-e* in the first meeting 350 to see the multi-meeting participant 404*a* speaking without hearing the audio stream. As such, it could be desirable for the multi-meeting participants representations to change from a live video stream to a less conspicuous representation. For example, as illustrated, the multi-meeting participant 404*a*'s representation on the roster 402A may change to a static or generic picture of the participant 404*a*. In some embodiments, the representation may be of an avatar of the multi-meeting participant 404*a*. The multi-meeting participant's 404*a* representation may be the same or similar to the representation that is presented when a video conference participant turns off his or her video stream.

In some cases, the representation may change to a near life-like representation of the multi-meeting participant 404a. For example, in some cases, the participant 404a may desire to hide the fact that he or she has engaged in another meeting. As such, the participant 404a may establish a loop snippet of the participant 404a as the participant 404a normally acts in the first meeting 350. For example, the loop snippet may be of the participant 404a listening and watching the first meeting 350 or of the participant 404a nodding or smiling occasionally. The loop snippet may run in a continuous loop (e.g., start to finish of the snippet sequentially) or the loop snippet may run from back and forth (e.g., from the start to the finish, from the finish to the start of the snippet). In an example embodiment, the loop snippet may be from 5 to 10 seconds in duration, from 10-15 seconds in duration, or from 15-30 seconds in duration.

To prepare the loop snippet, the participant 404ba may be prompted to generate a loop snippet upon joining the first meeting 350 or in some embodiments upon joining the second meeting 360. For example, when the participant 404a joins the second meeting 360, a prompt may be displayed to the participant 404a with an option to prepare the loop snippet. The participant 404a may accept the option to prepare the loop snippet, by for example, selecting a button or selection with that option. Upon accepting the option, a short segment of the video stream from the participant's 404a client device may be captured and recorded. In some embodiments, a short segment of video stream from the participant's 404a client device may be automatically captured and recorded without prompting the participant 404a. The short segment, which may be a 1 to 5 second segment, a 5 to 10 second segment, or a 10 to 30 second segment of the video stream, may be used to prepare the loop segment. As noted above, the short segment of video stream may be modified or altered, such as for example by looping the video segment, to create the loop snippet.

In other embodiments, the representation may indicate that the participant 404a is in the second meeting 350 currently, such as artificially changing to indicate that the participant 404a is attending another meeting and will return shortly. For example, the representation may illustrate the participant as turning away from the camera, change to an away symbol, or a caricature/cartoon of the participant 404a. The degree to which participants can hide their involvement in a second meeting 360 may be determined by the host. For example, when scheduling the meeting, the host may change one or more settings relating to the representation of the participant 404a. In some embodiments, the host may allow participants to hide their participation in a second meeting 360, and thus allow loop snippets, while in other embodiments, the host may not allow participants to hide their participation in other meetings. In such cases, when the participant 404a interacts with the second meeting 360, the representation of the participant 404a may indicate that the participant 404a is interacting with the second meeting 360.

As noted above, when participants attend two meetings simultaneously, the participants may not be fully paying attention to one of the meetings. The inattentiveness of the multi-meeting participants may result in the multi-meeting participants missing an attention cue. An attention cue may include personally identifiable information of a multi-meeting participant. For example, an attention cue may include the multi-meeting participant's name, a topic of interest to the multi-meeting participant, a project or topic that the multi-meeting participant is involved in, a location corresponding to the multi-meeting participant (e.g., office location or location of the multi-meeting participant), or a statement otherwise involving the multi-meeting participant. As can be imagined, if the primary meeting is the second meeting 360 but the speaker in the first meeting 350 asks the multi-meeting participant a question and the multi-meeting participant is not paying attention, the multi-meeting participant may be faced with embarrassment or trouble for not participating in the first meeting 350. In some embodiments, the attention cue may include an emotion detection. For example, the attention cue may include a joke, laughter, anger, or raised voices during the first meeting 350. In other embodiments, the attention cue may include a change in video streams or content being shared during the first meeting 350.

To assist multi-meeting participants in remaining engaged in the non-primary meeting and avoiding missing an attention cue, an attention assistant may be provided. The attention assistant may monitor the non-primary meeting for attention cues while the multi-meeting participant is engaged in the primary meeting.

Returning now to FIGS. 3A and 3B, the attention assistant functionality is described with reference to example system 300A and 300B for ease of discussion. As noted above, the video conference provider 310 hosts the first meeting 350 and a second meeting 360. When a primary meeting is selected for the multi-meeting participant, the attention assistant functionality may be invoked. The attention assistant may monitor the audio and video streams of the non-primary meeting (e.g., the first meeting 350) for attention cues for the multi-meeting participant focused on the primary meeting (e.g., the second meeting 360). In some embodiments, the attention assistant functionality may be specific to an individual multi-meeting participant (e.g., only monitoring for attention cues specific to that participant), or the attention assistant functionality may monitor the non-primary meeting for general attention cues (e.g., questions directed to all participants of the non-primary meeting). Once invoked, the attention assistant functionality may begin performing speech recognition on the audio and video streams of the non-primary meeting. For ease of the following discussion, the primary meeting is the second meeting 360 and the non-primary meeting is the first meeting 350.

To monitor the first meeting 350 for attention cues for a multi-meeting participant, the video and audio from each of the client devices 330a and 340a-e may be captured by the microphone and camera and the audio and video information may be forwarded to the video conference provider 310, which then distributes the audio and video generally as discussed above. To perform the attention assistant functionality, the video conference provider 310 may identify the audio and video streams for the first meeting 350 and indicate that speech recognition should be performed on the incoming audio data from each of the client devices 330a and 340a-e participating in the first meeting 350. For example, the video conference provider 310 may identify a client device that is transmitting audio and video streams during the first meeting 350 and perform speech recognition on the corresponding audio data. In the cases where the speech recognition is performed by a different remote computing device, the video conference provider 310 may provide the identified audio data from the first meeting to the remote computing device for speech recognition purposes. The specific systems for speech recognition and the attention assistant functionality are described in greater detail below with respect to FIGS. 7 and 8.

When the multi-meeting participant joins a second simultaneous meeting, the multi-meeting participant can select an option to enable an attention assistant, such as by enabling the attention assistant functionality. Although the following example is described with respect to client device 340a, it should be understood that the following could apply to each of the client devices 330a, 330b, and 340b-m. After enabling that functionality, the client device 340a sends an indication to the video conference provider 310 indicating the attention assistant feature has been enabled. The attention assistant functionality may include a speech recognition function and a search function. For example, once the attention assistant functionality is enabled, the speech recognition function may be initiated. In response to enablement of the attention assistant functionality, the video conference provider 310 may begin executing speech recognition on incoming audio data from each of the client devices 330a and 340b-e. Speech recognition may only be performed on the incoming audio data. For example, if only the host is speaking, then the video conference provider 310 may only perform speech recognition on the audio data from the host client device 330a.

In some embodiments, the speech recognition function may be performed by a computing device other than the video conference provider 310. That is the speech recognition function of the attention assistant may be locally enabled or cloud-based. For example, the client device 340a may execute speech recognition on the incoming audio data received by the video conference provider 310. Depending on the capabilities of the client device 340a, performing speech recognition by the client device 340a may be resource intensive and thus it may be preferred for the video conference provider 310, or another remote computer device, to perform speech recognition. In other embodiments, another remote computing device, such as a speech recognition third party, may perform speech recognition on the audio data received by the video conference provider.

As described in greater detail below with respect to FIG. 7, to perform speech recognition, a transcript of the audio data may be generated. For example, if the speech recognition function of the attention assistant is locally enabled, the client device 340a may receive or generate a substantially real-time transcript of the incoming audio data during the video conference. In other examples, the speech recognition function of the attention assistant may be cloud-based. In such examples, the video conference provider 310, or another remote computing device, may generate the substantially real-time transcript of the incoming audio data during the video conference.

Once the speech recognition is performed, recognized words from the speech recognition process may be monitored to identify one or more attention cues for participant A corresponding to the client device 340a. In some embodiments, the speech recognition process may include emotion detection. For example, the speech recognition process may include monitoring for laughter or anger in the audio streams. The attention cue identification function of the attention assistant may be separate from the speech recognition function. For example, the speech recognition function may be performed remotely while the attention cue identification may be performed locally by the client device 340a. In other embodiments, both functions may be performed remotely or both functions may be performed locally. In embodiments, the attention cue identification may be stored and/or performed locally on the client device 340a.

It should be appreciated that the attention assistant functionality may be enabled or disabled at any time during a meeting. Enabling or disabling the functionality will cause the client device 340a to transmit an indication to the video conference provider 310 to activate or deactivate speech recognition for incoming audio to the client device 340a. Further, as noted above, while this example is discussed with respect to client device 340a, any of the client device 330a and 340b-340e may take advantage of such functionality by enabling respective attention assistant functionality as discussed herein.

In some embodiments, the attention assistant may be integrated into the video conferencing software. In other embodiments, the attention assistant may be a standalone application from the video conferencing application. For example, upon initiation of the video conferencing application, the attention assistant application may automatically launch. In cases where the attention assistant functionality is disabled upon launch of a video conference, the attention assistant application may launch when the attention assistant functionality is enabled by the user of the client device.

Once speech recognition is performed on the incoming audio data received by the client device 340a, the recognized words from the speech recognition may be provided to the attention assistant to perform the attention cue identification function. The recognized words include detected emotions. For example, laughter may be considered a recognized word. The recognized words may be provided to the attention cue identification function of the attention assistant running on the client device 340a substantially in real-time. In cases where the attention cue identification function is performed remotely, the recognized words from the speech recognition may be provided to the remote computing device to perform the attention cue identification function. Depending on where speech recognition is performed, the processing capabilities of the computing device performing speech recognition, and network conditions (if speech recognition is performed remotely from the client device), recognized words may be provided to the attention assistant within a few seconds of the user speaking them. For example, in some embodiments, the attention assistant may not include a speech recognition function. Instead, the attention assistant may receive the recognized words, for example via a transcript of the audio, from a remote computing device.

If an attention cue is identified, the attention assistant may notify the multi-meeting participant of the attention cue. Providing a notification of an attention cue to a multi-meeting may be done in a variety of ways. Referring now to FIG. 5, an example attention cue notification 520 displayed to a participant during multi-meeting mode via a GUI 500 is provided. The GUI 500 may be the same or similar to the GUI 400. For example, the GUI 500 may include the displays 408A and 408B corresponding to the first meeting 305 and the second meeting 306 as described with respect to FIG. 4.

As shown, the second meeting 360 may be the primary meeting, and as such, the display 408B may be the primary focus of the GUI 500. The first meeting 350 may be the non-primary meeting, so the display 408A for the first meeting 350 may be positioned behind the display 408A. Because the second meeting 360 is the primary meeting, the multi-meeting participant may be focused on the display 408B. To aid in focusing on the primary meeting, the multi-meeting participant may have muted or turned down the volume of the audio streams associated with the first meeting 350. As such, the multi-meeting participant may not be paying attention to the content of the first meeting 350.

To assist the multi-meeting participant, the attention assistant may be monitoring the audio and/or video streams of the first meeting 350 for an attention cue relevant to the multi-meeting participant. As depicted, the participant 404*e* may be presenting during the first meeting 350. In this example, the participant 404*e* may ask the multi-meeting participant a question. Since the multi-meeting participant is focused on the primary meeting (e.g., the second meeting 360), the multi-meeting participant may not hear or catch the question from the participant 404*e*. To notify the multi-meeting participant that the participant 404*e* is addressing him or her in the first meeting 350, the attention assistant may provide a notification 520 on the display 408A indicating the attention cue for the multi-meeting participant.

As illustrated, the notification 520 may be displayed prominently on the display 408A so to catch the attention of the multi-meeting participant. In some embodiments, the notification 520 may cover a portion of the display 408B of the second meeting 360. In other embodiments, the notification 520 may be an audible notification. For example, a bell, chime, or other sound may be used to alert the multi-meeting participant of the attention cue. In other embodiments, a volume of the audio stream from the first meeting 350 may increase and/or the display 408A of the video stream from the first meeting 350 may change in size, such as an increase, to draw attention to the first meeting 350. In some embodiments, a transcription of the audio stream from the first meeting 350 may be provided via the display 408A when the second meeting 360 is selected as the primary meeting. In such cases, the notification 520 may include an increase in the text size of the transcription of the audio stream from the first meeting 350.

Upon receiving the notification 520 of the attention cue, the multi-meeting participant may increase the audio from the first meeting 350 to determine if he or she needs to reenter the first meeting 350. In some embodiments, the volume of the audio for the first meeting 350 may automatically increase upon notification 520 of the attention cue. The volume may be held increased for a duration of time (e.g., 5-30 seconds) before returning to the previously set volume. This may also serve to alert the multi-meeting participant of the attention cue. Additionally, the increase in volume may allow the multi-meeting participant to determine whether he or she needs to return to the first meeting 350 to respond to the attention cue. In some embodiments, in addition to or instead of increasing the volume of the audio from the first meeting 350, the volume of the audio from the second meeting 360 may be decreased or even muted. Similarly, a decrease in volume of the audio from the second meeting 360 may serve to notify the multi-meeting participant of the attention cue or allow the multi-meeting participant to better hear the audio from the first meeting 350.

If the multi-meeting participant determines that he or she needs to return to the first meeting 350, for example to respond to the identified attention cue, the multi-meeting participant may select the notification 520 with cursor 522 or may simply select the display 408A to select the first meeting 350 as the primary meeting. In some embodiments, prior to selecting the first meeting 350 as the primary meeting, the multi-meeting participant may want to understand the context of the attention cue. To do so, the multi-meeting participant may select a replay cue 524. The replay cue 524 may provide a snippet replay of the audio and video streams from the first meeting for a few seconds before and/or after the attention cue was identified to provide context to the multi-meeting participant. The replay cue 524 may appear on display 408A of the video stream from the first meeting when the notification 520 is displayed to the multi-meeting participant. In other embodiments, the replay cue 524 may always be provided on display 408A and allow the multi-meeting participant to replay a short segment of the audio and video streams from the first meeting 350. In such cases, the replay cue 524 may provide the replay functionality to multi-meeting participants at any time. This may allow multi-meeting participants to gain context on information that may have caught their attention while in the sidebar meeting, regardless of attention cue notifications.

The snippet replay may be a portion of the audio and video streams from the first meeting in the seconds leading up to the attention cue. For example, the snippet replay may include 5-30 seconds of audio and video streams leading up to the audio snippet including the attention cue. In some cases, the snippet replay may include a few seconds after the attention cue is identified. For example, the snippet replay may include 5 to 10 seconds after the attention cue is identified. To provide the snippet, the client software may maintain a circular recording buffer of a short period of the first meeting, e.g., 10-30 s, that may be configurable by the user. Thus, when changing focus to the first meeting 350, the participant may be presented with the option to review the recorded portion of the first meeting 350 as mentioned above.

To allow the multi-meeting participant to quickly review the snippet replay and respond to the attention cue in an appropriate amount of time, the snippet replay may be a sped-up version of the audio and video streams. For example, the snippet replay may include the previous 10 seconds of the audio and video streams, but may be replayed to the transitioning participant in 5 or less seconds. In other embodiments, the snippet replay may be shortened or modified for faster review. For example, filler or excess words, such as "um," and/or extended pauses or silences may be removed to generate the snippet replay. In this manner, the multi-meeting participant can be alerted of the attention cue, provided context for the attention cue, and transition back into the first meeting as needed without missing context or information needed to respond to the attention cue. In other embodiments, a summarization of the previous 5-30 seconds of the first meeting may be provided. For example, an automatic summarization module may provide a brief summarization of the prior 5-30 seconds of the first meeting via the snippet replay.

If the multi-meeting participant selects the first meeting 350 as the primary meeting, based on receiving the attention cue, or if the attention assistant automatically selects the second meeting to be the primary meeting, the display 408A may transition to be the primary focus of the GUI 500. Turning now to FIG. 6, a transition between primary meetings during multi-meeting mode is provided, according to an embodiment. FIG. 6 provides a GUI 600 which may be the same as the GUI 400 or 500.

As shown, when the multi-meeting participant switches to the first meeting 350 as the primary meeting, the display 408A for the first meeting 350 may rearrange and change size to become the primary focus of the GUI 600. The audio streams for the first meeting 350 and the second meeting 360 may be similarly modified based on the switch of the primary meeting, as described above. In addition to the video and audio changes for the displays 408A and 408B and their corresponding audio streams, the video stream of the multi-meeting participant may also be modified. For example, returning to FIG. 5, the video stream for the multi-meeting participant (participant 404*a*) may be used in the roster 402B of the primary meeting. However, to minimize confusion, the video stream for the multi-meeting participant may be paused for the first meeting 350. As such, an image or logo may be used on the roster 402A for the multi-meeting participant (participant 404a).

Returning now to FIG. 6, when the multi-meeting participant switches the primary meeting to the first meeting 350, his or her video stream may be paused or terminated for the second meeting 360 as it is now the non-primary meeting. As such, the roster 402B may include only an image or logo for the multi-meeting participant (participant 404a) and the roster 402A may now include the video stream for the multi-meeting participant.

Figure 7:
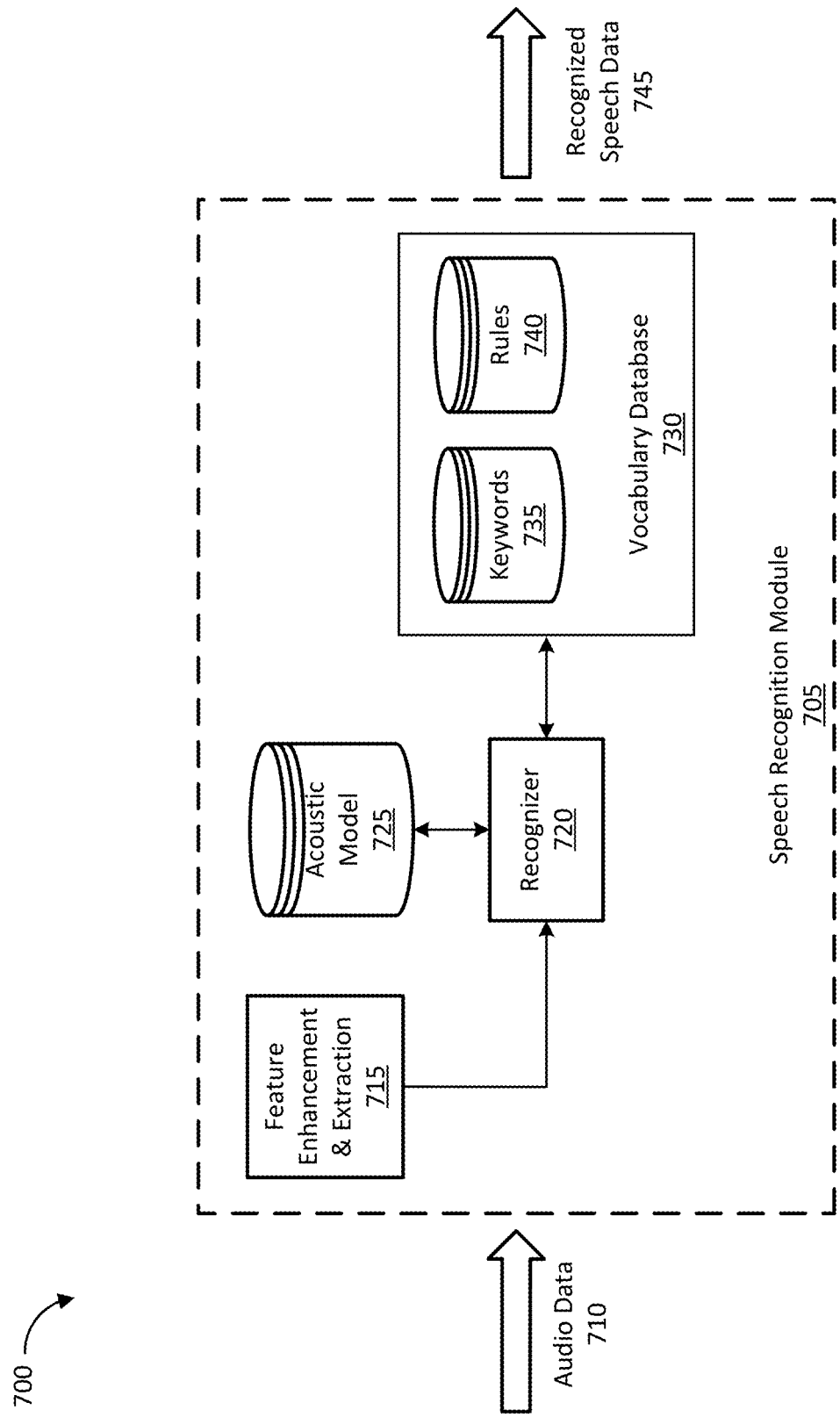
FIG. 7 illustrates an example speech recognition system that may be locally or remotely executed, according to an embodiment herein.

Turning now to FIG. 7, an example speech recognition system 700 that may be used to provide attention assistance is provided. The speech recognition system 700 may be executed locally or remotely. For example, the speech recognition system 700 may be locally executed on a client device, such as the client device 340a; however, in other embodiments, the speech recognition system 700 may be cloud-based and/or remotely executed by a video conference provider, such as the video conference provider 310, or a third-party system.

Figure 8:
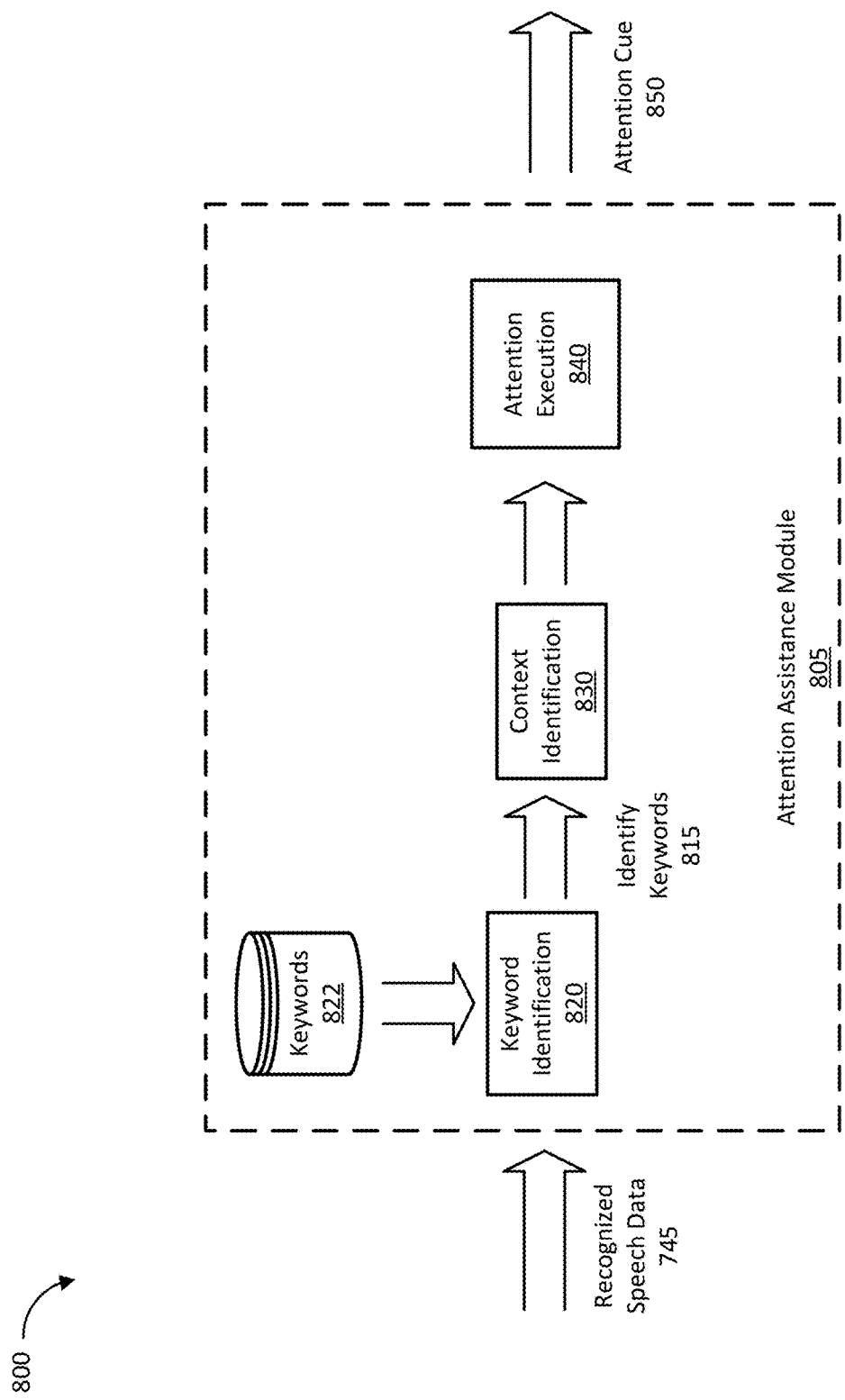
FIG. 8 illustrates an example multi-meeting mode system that may be locally or remotely executed, according to an embodiment herein.

The speech recognition system 700, along with the attention assistance system 800 described in greater detail with respect to FIG. 8, may be used to perform a variety of multi-meeting mode functions. For example, in some embodiments, the speech recognition system 700 may be used to identify an attention cue for a multi-meeting participant. In other embodiments, the speech recognition system 700 may be used to process the audio streams to generate a transcript of the meeting.

To perform speech recognition, the speech recognition system 700 may include a speech recognition module 705. The speech recognition module 705 may receive audio data 710. The audio data 710 may correspond to audio captured by the client device 340a, for example by a microphone. In other embodiments, the audio data 710 may be received from the video conference provider 310. The audio data 710 may be a recording of an audio stream or may be a transcript of the audio stream. The speech recognition module 705 may be or include a speech recognition system or model as known in the art. The following is an example speech recognition module following an example speech recognition process; however, it should be understood that other speech recognition modules or processes may be used.

Once the audio data 710 is received by the speech recognition module 705, the audio data 710 may be processed by a feature enhancement and extraction module 715. The feature enhancement and extraction module 715 may analyze the audio data for features corresponding to words and then enhance and extract any identified features. The identified features may correspond to audio waveforms present in human speech.

The speech recognition module 705 may also include a recognizer 720. The recognizer 720 may receive the identified features from the audio data 710. The recognizer 720 may employ an acoustic model 725 and a vocabulary database 730 to determine or associate the identified features in the audio data 710 to one or more words.

In an example embodiment, the acoustic model 725 may analyze the raw audio waveforms in the identified features and determine a corresponding phoneme for each waveform. In some embodiments, this is performed at the character, phoneme, or other subword level. The vocabulary database 730 may be a language model. The vocabulary database 730 may include a rules database 740 and a word database 735. The rules database 740 may provide various rules for speech, allowing the recognizer to discard any association of identified features (e.g., audio waveforms) to phonemes that are improbable given the constraints of proper grammar and the topic of discussion. Once an appropriate mapping of the identified features to phonemes is generated, the recognizer 720 may determine words associated with the phonemes. The words may be based on the words database 735.

Once the phonemes are associated with respective words, recognized speech data 745 is generated. It should be understood that this process may be performed nearly instantaneously. For example, the speech recognition module 705 may generate the recognized speech data 745 during the meeting as the audio streams are being received by the video conference provider 310 or another system that is hosting the speech recognition system 700. The recognized speech 745 may be then used to perform one or more multi-meeting mode functions, such as recognizing an attention cue in an audio stream.

Turning now to FIG. 8, an attention assistance system 800 is provided. The attention assistance system 800 may include attention assistance module 805 that is used to perform one or more of the multi-meeting functions described herein. For example, in one case, the recognized speech 745 may be received from the speech recognition system 700 to identify an attention cue in an audio stream.

The recognized speech 745 may be received by the keyword identification system 820. The keyword identification system 820 may identify one or more keywords in the recognized speech data 745. The database of known keywords 822 may be queried to identify any keywords in the stream of recognized speech data 745. Keywords in the keyword database 822 may be based on the participant for which the multi-meeting mode functionality is being invoked. For example, if the multi-meeting mode functionality is invoked for the client device 340a, then the keywords in the keyword database 822 may relate to or be based on participant A, who corresponds to the client device 340a. The keywords may include words relating to the identity of participant A or personally identifiable information about participant A, such as the first and last name of participant A. In some cases, the keywords may include an office or location of participant A. Other keywords may include the names of projects, areas, or topics that participant A is involved in. In some embodiments, keywords may include one or more emotion expressions, such as a distinct laughter, or identifiable speech characteristics, such as an accent.

The keywords in the keyword database 822 may be gathered from participant A or from the client device 340a. For example, upon enabling the multi-meeting mode functionality, participant A may be prompted to input personally identifiable keywords that the attention assistance module 805 should monitor the virtual meeting for (e.g., nickname). In other embodiments, the attention assistance module 805 may receive some or all the keywords from the participant's profile with the video conference provider 310. In still other embodiments, the attention assistance module 805 may gather keywords from applications on the client device 340a. If the attention assistance module 805 has permission to search other applications on the client device 340a, the attention assistance module 805 may gather keywords from folders, calendars, emails, or other applications running on the client device 340a.

It should be understood that a keyword may include more than one word. For example, "Project Alpha" may be a "keyword" as indicating that the phrase "Project Alpha" is a personally identifiable characteristic for participant A. Depending on various implementations, multi-word keywords may be treated as a single keyword or as multiple associated keywords. Further, a keyword may have multiple different forms. For example, a keyword may be a verb, which may be spelled different depending on context, e.g., it is conjugated differently depending on tense, subject, etc. Thus, a keyword may include variants of a base word, e.g., "look for," "looking for," and "looked for." In some examples each of these may be a distinct keyword, while in other examples, the variants may be associated with a base term, e.g., "look," that is used as the keyword. However, any suitable approach to recognizing keywords may be used.

If one or more keywords 815 is recognized, the attention assistance module 805 then may identify a context 830 associated with the keyword 815. In this example, to identify a context, the attention assistance module 805 may employ a trained machine learning ("ML") technique to semantically analyze the speech or transcript associated with the identified keyword 815 to determine additional related keywords and/or descriptors. To perform the analysis, the trained ML technique may be provided the keyword(s) and a predetermined number of words near the keyword, e.g., preceding and following the keyword(s), such as five to ten words preceding and following the keyword(s). Words such as articles (e.g., "a", "the") or prepositions such as "of" or "for" may be omitted from the word count in some examples.

The ML technique may receive the sequence of words and determine whether an attention cue was intended. For example, in an embodiment where an attention cue is invoked audibly by a participant, if the participant says "Do you have any thoughts on Project White House," the ML technique may semantically analyze the words and determine that the speaker is requesting the attention of the participant A for which Project White House is relevant. Similarly, if the speaker says "How is the weather in Denver?," the ML technique can semantically analyze and determine that the speaker is intending an attention cue. Alternatively, if the speaker says "I liked the movie with the aliens and the White House" the ML technique may determine that no attention cue was intended and refrain from alerting the video conference provider 310 of the attention cue.

While ML techniques may be employed in some examples, other examples of context identification 830 functionality may perform word searches for attention cue words or phrases within a predetermined number of words from the identified keyword(s) 815. For example, considering the example above where the speaker says "Let's discuss the White House Project," the context identification may perform a search for certain words preceding "White House Project", such as "Let's," "discuss," etc. If one of those words is found preceding "white House Project" (the relevant keyword to the participant A) by a predetermined number of words, the context identification 830 functionality may determine that the term "White House Project" was meant as an attention cue.

Since people may use jargon or colloquial terms to refer to particular actions, the context identification 830 functionality may normalize recognized words to specific meanings. For example, the terms "kiddos," "little ones," "youngsters," "kids," etc. all refer to one's children. Thus, the context identification 830 functionality may map such terms to have a single meaning (e.g., children). Such mappings may be provided for multiple different phrases and corresponding terms. Similarly, synonyms or words related to keywords may also be identified.

Once the context identification 830 has identified the one or more keywords 815 and identified the context of the identified keywords 815, the attention assistance module 805 may perform an attention cue execution 840. The attention assistance module 805 may determine, based on the identification of the keywords 815, and the context of the keywords, that participant A is making an attention cue 850. The attention cue execution 840 may communicate with the video conferencing software to notify the participant A of the attention cue 850 in the non-primary meeting. In some embodiments, participant A may receive a notification, such as the notification 520, indicating that the attention cue 850 has been identified and ask if participant A would like to switch to the non-primary meeting. In other embodiments, the video conference provider 310 may automatically switch the non-primary meeting to the primary meeting to direct the participant A's attention to the attention cue 850. The attention assistance module 805 may transmit instructions to the video conferencing software, or initiate instructions within the video conferencing software if the attention assistance module 805 is part of the video conferencing software, to provide a notification of the attention cue to the participant.

One or both of the speech recognition system 700 and/or the attention assistance system 800 may be used to generate a transcript during a meeting and/or edit a transcript of a meeting recording. For example, if the participant A requests live transcription of the audio streams from a non-primary meeting, the speech recognition system 700 may be used to generate the transcript 410.

Figure 9:
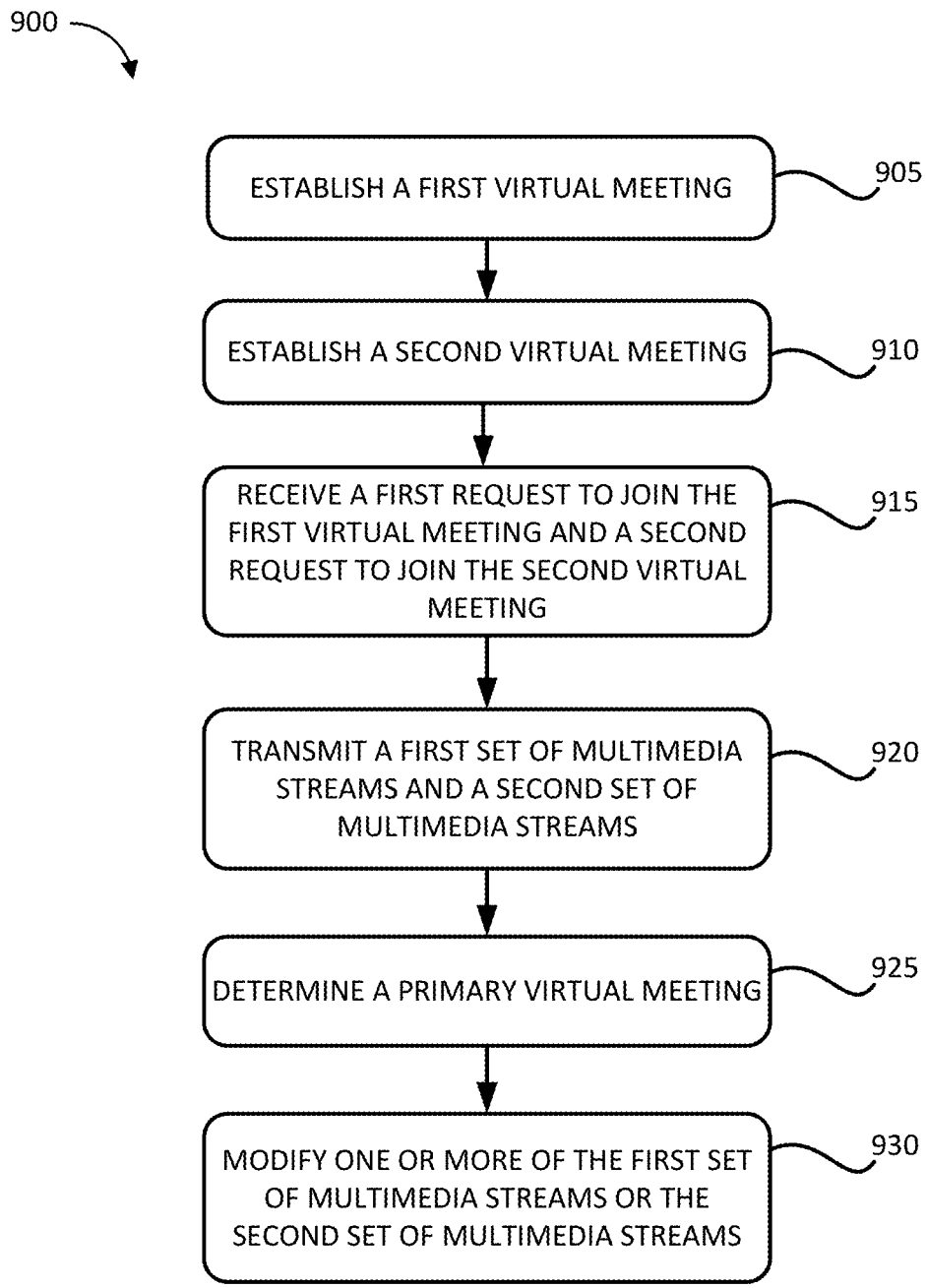
FIG. 9 depicts an exemplary method for providing a multi-meeting mode during virtual meetings, according to an embodiment herein.

Referring now to FIG. 9, a flowchart of an example method 900 for providing a multi-meeting mode during virtual meetings is provided. The description of the method 900 in FIG. 9 will be made with reference to FIGS. 3A-8, however any suitable system according to this disclosure may be used, such as the example systems 100 and 200, shown in FIGS. 1 and 2.

Method 900 may include steps 905 and 910. At step 905, the method 900 may include establishing a first virtual meeting. For example, the video conference provider 310 may establish the first meeting 350. The first meeting 350 may include a first plurality of participants, such as participants associated with client devices 340*b-e*. At step 910, the method 900 may include establishing a second virtual meeting. For example, the video conference provider 310 may establish the second meeting 360. The second meting 360 may include a second plurality of participants, such as participants associated with the client devices 340*f-m*.

At step 915, the method 900 may include receiving a first request and a second request from a first client device. For example, the video conference provider 310 may receive from the first client device 340*a* the first request and the second request. The first request may be to join the first meeting 350 and a second request to join the second meeting 360.

At step 920, the method 900 may include transmitting a first set of multimedia streams and a second set of multimedia streams. For example, the video conference provider 310 may transmit to the first client device 340*a* the first set of multimedia streams and the second set of multimedia streams. The first set of multimedia streams may correspond to one or more multimedia streams that are exchanged during the first meeting 350 and the second set of multimedia streams may correspond to one or more multimedia streams that are exchanged during the second meeting 360. Multimedia streams may include one or more of an audio stream, a video stream, or a chat channel stream.

In an example where the first set of multimedia streams comprises a first chat channel and the second set of multimedia streams comprises a second chat channel, the method 900 may include receiving, from the first client device 340a, a request to add a first participant from the first meeting 350 and a second participant from the second meeting 360 to a third chat channel. Based on this request, the video conference provider 310 may generate a third chat channel. The video conference provider 310 may join the client devices associated with each of the first participant and the second participant to the third chat channel and join the first client device 340a to the third chat channel.

At step 925, the method 900 may include determining a primary meeting. For example, the video conference provider 310 may determine a primary meeting based on input from the first client device 340a. The primary meeting may be determined to be one of the first meeting 350 or the second meeting 360.

At step 930, the method 900 may include modifying one or more of the first set of multimedia streams or the second set of multimedia streams based on the determination of the primary meeting. For example, the video conference provider 310 may modify one or more of the first set of multimedia streams or the second set of multimedia streams based on the determination of the primary meeting. Modification to the first or second set of multimedia streams may include modifying a volume of an audio stream associated with one of the first or second set of multimedia streams or modifying a video stream associated with one of the first or second set of multimedia streams. In some examples, determining, by the video conference provider 310, the primary virtual meeting based on input from the first client device 340a may further include determining, based on a first audio stream received from the first client device 340a, that the primary meeting is the first meeting 350. In such examples, modifying, by the video conference provider 310, one or more of the first set of multimedia streams or the second set of multimedia streams based on the primary virtual meeting may include modifying, by the virtual meeting 310, one or more audio streams within the second set of multimedia streams based on the primary virtual meeting being the first meeting 350.

In some embodiments, the method 900 may further include determining an attention cue in at least one of the first set of multimedia streams or the second set of multimedia streams. For example, an attention assistant may determine an attention cue within the first or second set of multimedia streams. Then based on the attention cue, the method 900 may include providing, to the first client device 340a, an alert. The alert may notify the first client device 340a of the attention cue. In some embodiments, the video conference provider 310 may determine the primary virtual meeting based on the attention cue.

In some embodiments, determining the attention cue in at least one of the first set of multimedia streams or the second set of multimedia streams may include performing, by the video conference provider 310, speech recognition on at least one of the first set of multimedia streams or the second set of multimedia streams, and determining, by the attention assistant, one or more keywords based on the speech recognition. The one or more keywords may correspond to the attention cue.

In some embodiments, the method 900 may further include receiving, from the first client device 340a, a request to join one or more participants from the second meeting 360 into the first meeting 350. In such embodiments, the one or more participants may not be part of the first meeting 350. Based on the request, the video conference provider 350 may join the one or more participants from the second meeting 360 into the first meeting 350.

Figure 10:
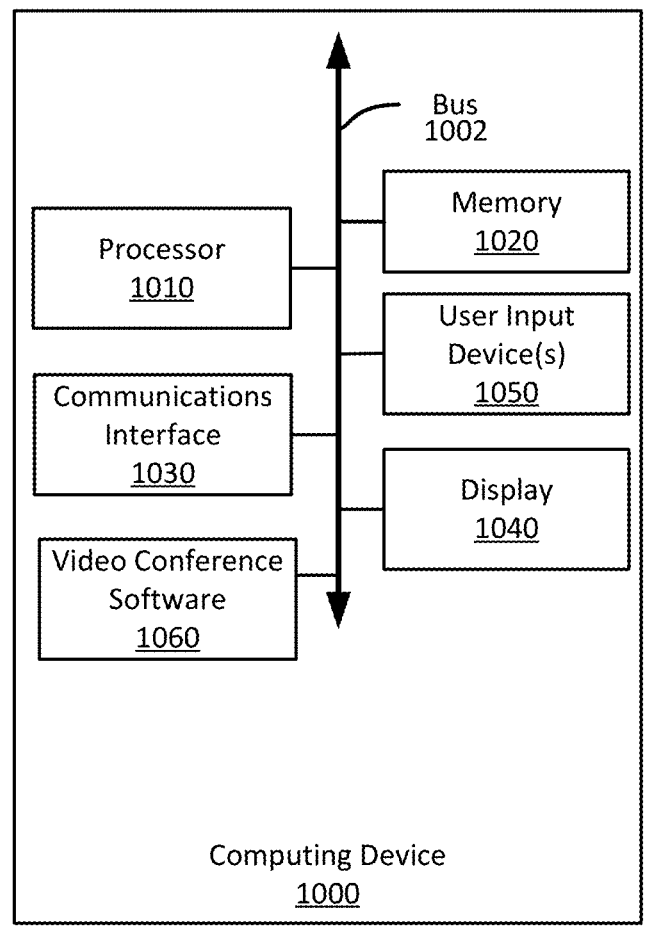
FIG. 10 shows an example computing device suitable for providing a multi-meeting mode during virtual meetings, according to this disclosure

Referring now to FIG. 10, FIG. 10 shows an example computing device 1000 suitable for use in example systems or methods for providing a second meeting during a video conference and/or providing attention assistant functionality during the sidebar meeting. The example computing device 1000 includes a processor 1010 which is in communication with the memory 1020 and other components of the computing device 1000 using one or more communications buses 1002. The processor 1010 is configured to execute processor-executable instructions stored in the memory 1020 to perform one or more methods for providing a multi-meeting mode, such as part or all of the example method 900, described above with respect to FIG. 9. The computing device, in this example, also includes one or more user input devices 1050, such as a keyboard, mouse, touchscreen, video input device (e.g., one or more cameras), microphone, etc., to accept user input. The computing device 1000 also includes a display 1040 to provide visual output to a user.

The computing device 1000 also includes a communications interface 1030. In some examples, the communications interface 1030 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Examples

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification As used below, any reference to a series of examples is to be understood as a reference to each of those examples disjunctively (e.g., "Examples 1-4" is to be understood as "Examples 1, 2, 3, or 4").

Example 1 is a system comprising: a non-transitory computer-readable medium; a communications interface; and a processor communicatively coupled to the non-transitory computer-readable medium and the communications interface, the processor configured to execute processor-executable instructions stored in the non-transitory computer-readable medium to: establish a first virtual meeting having a first plurality of participants; establish a second virtual meeting having a second plurality of participants, the second virtual meeting concurrent with the first virtual meeting; receive, from a first client device, a first request to join the first virtual meeting and a second request to join the second virtual meeting; transmit to the first client device: a first set of multimedia streams exchanged during the first virtual meeting; and a second set of multimedia streams exchanged during the second virtual meeting, wherein the multimedia streams comprise one or more of an audio stream or a video stream; determine, based on input from the first client device, a primary virtual meeting, wherein the primary virtual meeting is one of the first virtual meeting or the second virtual meeting; and modify one or more of the first set of multimedia streams or the second set of multimedia streams based on the primary virtual meeting.

Example 2 is the system of any previous or subsequent Example, wherein instructions to determine, based on the input from the first client device, the primary virtual meeting further causes the processor to execute further processor-executable instructions stored in the non-transitory computer-readable medium to: detect one or more spoken words via a first audio stream from the first client device; and determine, based on the one or more spoken words, the primary virtual meeting.

Example 3 is the system of any previous or subsequent Example, wherein: the input from the first client device is a first audio stream from the first client device that is part of the first set of multimedia streams and the primary virtual meeting is the first virtual meeting; and the instructions to modify the one or more of the first set of multimedia streams or the second set of multimedia streams based on the primary virtual meeting further causes the processor to execute further processor-executable instructions stored in the non-transitory computer-readable medium to: modify the second set of multimedia streams based on the primary virtual meeting being the first virtual meeting, wherein modifying the second set of multimedia streams comprises decreasing a volume associated with one or more audio streams within the second set of multimedia streams.

Example 4 is the system of any previous or subsequent Example, wherein: the input from the first client device is a first audio stream from the first client device that is part of the first set of multimedia streams and the primary virtual meeting is the first virtual meeting; and the instructions to modify the one or more of the first set of multimedia streams or the second set of multimedia streams based on the primary virtual meeting further causes the processor to execute further processor-executable instructions stored in the non-transitory computer-readable medium to: modify the first set of multimedia streams based on the primary virtual meeting being the first virtual meeting, wherein modifying the first set of multimedia streams comprises enlarging one or more video streams within the first set of multimedia streams.

Example 5 is the system of any previous or subsequent Example, wherein instructions to modify the one or more of the first set of multimedia streams or the second set of multimedia streams based on the primary virtual meeting further causes the processor to execute further processor-executable instructions stored in the non-transitory computer-readable medium to: modify the first set of multimedia streams based on the primary virtual meeting being the first virtual meeting, wherein modifying the first set of multimedia streams comprises increasing a volume associated with one or more audio streams within the first set of multimedia streams.

Example 6 is the system of any previous or subsequent Example, wherein: the primary virtual meeting is determined to be the first virtual meeting; the second set of multimedia streams exchanged during the second virtual meeting comprise a first audio stream received from the first client device; and the processor is further configured to execute further processor-executable instructions stored in the non-transitory computer-readable medium to: mute the first audio stream within the second set of multimedia streams.

Example 7 is the system of any previous or subsequent Example, wherein: the primary virtual meeting is determined to be the first virtual meeting; the second set of multimedia streams exchanged during the second virtual meeting comprise a first video stream received from the first client device; and the processor is further configured to execute further processor-executable instructions stored in the non-transitory computer-readable medium to: modify one or more video settings associated with the first video stream within the second set of multimedia streams.

Example 8 is the system of any previous or subsequent Example, wherein the instructions to determine, based on the input from the first client device, the primary virtual meeting further cause the processor to execute further processor-executable instructions stored in the non-transitory computer-readable medium to: detect a selection by the first client device of the first virtual meeting; and determine, based on the selection of the first virtual meeting by the first client device, that the first virtual meeting is the primary virtual meeting.

Example 9 is the system of any previous or subsequent Example, wherein the instructions further cause the processor to execute further processor-executable instructions stored in the non-transitory computer-readable medium to: perform speech recognition on an audio stream from the first set of multimedia streams to identify one or more recognized words; and identify, based on the one or more recognized words, one or more keywords corresponding to an attention cue.

Example 10 is the system of any previous or subsequent Example, wherein the instructions further cause the processor to execute further processor-executable instructions stored in the non-transitory computer-readable medium to: identify the attention cue; and provide an alert, to the first client device, based on the attention cue.

Example 11 is a method comprising: establishing, by a video conference provider, a first virtual meeting having a first plurality of participants; establishing, by the video conference provider, a second virtual meeting having a second plurality of participants, the second virtual meeting concurrent with the first virtual meeting; receiving, from a first client device, a first request to join the first virtual meeting and a second request to join the second virtual meeting; transmitting, by the video conference provider, to the first client device: a first set of multimedia streams exchanged during the first virtual meeting; and a second set of multimedia streams exchanged during the second virtual meeting, wherein the multimedia streams comprise one or more of an audio stream or a video stream; determining, by the video conference provider, a primary virtual meeting based on input from the first client device, wherein the primary virtual meeting is one of the first virtual meeting or the second virtual meeting; and modifying, by the video conference provider, one or more of the first set of multimedia streams or the second set of multimedia streams based on the primary virtual meeting.

Example 12 is the method of any previous or subsequent Example, wherein the method further comprises: determining an attention cue in at least one of the first set of multimedia streams or the second set of multimedia streams; and providing, to the first client device, an alert based on the attention cue.

Example 13 is the method of any previous or subsequent Example, wherein the method further comprises: determining, by the video conference provider, the primary virtual meeting based on the attention cue.

Example 14 is the method of any previous or subsequent Example, wherein determining the attention cue in at least one of the first set of multimedia streams or the second set of multimedia streams comprises: performing, by the video conference provider, speech recognition on at least one of the first set of multimedia streams or the second set of multimedia streams; and determining one or more keywords based on the speech recognition, wherein the one or more keywords correspond to the attention cue.

Example 15 is the method of any previous or subsequent Example, wherein: determining, by the video conference provider, the primary virtual meeting based on input from the first client device comprises: determining, based on a first audio stream received from the first client device, that the primary virtual meeting is the first virtual meeting; and modifying, by the video conference provider, one or more of the first set of multimedia streams or the second set of multimedia streams based on the primary virtual meeting comprises: modifying, by the video conference provider, one or more audio streams within the second set of multimedia streams based on the primary virtual meeting being the first virtual meeting.

Example 16 is the method of any previous or subsequent Example, the method further comprising: receiving, from the first client device, a request to join one or more participants from the second virtual meeting into the first virtual meeting, wherein the one or more participants are not part of the first virtual meeting; and joining, by the video conference provider, the one or more participants from the second virtual meeting into the first virtual meeting.

Example 17 is the method of any previous or subsequent Example, wherein the first set of multimedia streams comprises a first chat channel, and the second set of multimedia streams comprises a second chat channel, and the method further comprises: receiving, from the first client device, a request to add a first participant from the first virtual meeting and a second participant from the second virtual meeting to a third chat channel; generating, by the video conference provider, the third chat channel; joining, by the video conference provider, client devices associated with each of the first participant and the second participant to the third chat channel; and joining, by the video conference provider, the first client device to the third chat channel.

Example 18 is a non-transitory computer-readable medium comprising processor-executable instructions configured to cause one or more processors to: establish a first virtual meeting having a first plurality of participants; establish a second virtual meeting having a second plurality of participants, the second virtual meeting concurrent with the first virtual meeting; receive, from a first client device, a first request to join the first virtual meeting and a second request to join the second virtual meeting; transmit to the first client device: a first set of multimedia streams exchanged during the first virtual meeting; and a second set of multimedia streams exchanged during the second virtual meeting, wherein the multimedia streams comprise one or more of an audio stream or a video stream; determine, based on input from the first client device, a primary virtual meeting, wherein the primary virtual meeting is one of the first virtual meeting or the second virtual meeting; and modify one or more of the first set of multimedia streams or the second set of multimedia streams based on the primary virtual meeting.

Example 19 is the non-transitory computer-readable medium of any previous or subsequent Example, wherein the processor is configured to execute further processor-executable instructions stored in the non-transitory computer-readable medium to: identify an attention cue in an audio stream from the first set of multimedia streams corresponding to the first virtual meeting; and generate an alert based on the attention cue identified in the audio stream from the first set of multimedia streams.

Example 20 is the non-transitory computer-readable medium of any previous or subsequent Example, wherein the processor is configured to execute further processor-executable instructions stored in the non-transitory computer-readable medium to: perform speech recognition on the audio stream from the first set of multimedia streams to identify one or more recognized words; and identify, based on the one or more recognized words, one or more keywords corresponding to the attention cue.

Example 21 is the non-transitory computer-readable medium of any previous or subsequent Example, wherein the processor is configured to execute further processor-executable instructions stored in the non-transitory computer-readable medium to: responsive to generating the alert based on the attention cue automatically provide instructions to modify a volume of the second set of multimedia streams corresponding to the second virtual meeting to the first client device.

Example 22 is the non-transitory computer-readable medium of any previous or subsequent Example, wherein the attention cue comprises personally identifiable information corresponding to a participant associated with the first client device and comprises at least one of: a name of the participant; a project involving the participant; a company corresponding to the participant; or a location corresponding to the participant.

Example 23 is the non-transitory computer-readable medium of any previous or subsequent Example, wherein the processor is configured to execute further processor-executable instructions stored in the non-transitory computer-readable medium to: generate a first transcript corresponding to one or more audio streams in the first set of multimedia streams; generate a second transcript corresponding to one or more audio streams in the second set of multimedia streams; and transmit, to the first client device, the first transcript and the second transcript.

That which is claimed is:

1. A system comprising:
   a non-transitory computer-readable medium;
   a communications interface; and
   a processor communicatively coupled to the non-transitory computer-readable medium and the communications interface, the processor configured to execute processor-executable instructions stored in the non-transitory computer-readable medium to:
      join, by a first client device, a first virtual meeting hosted by a virtual conference provider and having a first plurality of participants;
      join, by the first client device, a second virtual meeting hosted by the virtual conference provider and having a second plurality of participants, the second virtual meeting concurrent with the first virtual meeting;
      receive from the virtual conference provider:
         a first set of multimedia streams corresponding to the first virtual meeting; and
         a second set of multimedia streams corresponding to the second virtual meeting,
      wherein the first and second sets of multimedia streams comprise one or more of an audio stream or a video stream;
      determine, based on an input, a primary virtual meeting, wherein the primary virtual meeting is one of the first virtual meeting or the second virtual meeting;
      output a replay cue associated with the primary virtual meeting; and
      modify one or more of the first set of multimedia streams or the second set of multimedia streams based on the primary virtual meeting.

2. The system of claim 1, wherein instructions to determine, based on the input, the primary virtual meeting further causes the processor to execute further processor-executable instructions stored in the non-transitory computer-readable medium to:
   detect one or more spoken words via a first audio stream from the first client device; and
   determine, based on the one or more spoken words, the primary virtual meeting.

3. The system of claim 1, wherein:
   the input is a first audio stream from the first client device that corresponds to the first virtual meeting and the primary virtual meeting is the first virtual meeting; and
   the instructions to modify the one or more of the first set of multimedia streams or the second set of multimedia streams based on the primary virtual meeting further causes the processor to execute further processor-executable instructions stored in the non-transitory computer-readable medium to:
   modify the second set of multimedia streams based on the primary virtual meeting being the first virtual meeting, wherein modifying the second set of multimedia streams comprises decreasing a volume associated with one or more audio streams within the second set of multimedia streams.

4. The system of claim 1, wherein:
   the input is a first audio stream from the first client device that corresponds to the first virtual meeting and the primary virtual meeting is the first virtual meeting; and
   the instructions to modify the one or more of the first set of multimedia streams or the second set of multimedia streams based on the primary virtual meeting further causes the processor to execute further processor-executable instructions stored in the non-transitory computer-readable medium to:
   modify the first set of multimedia streams based on the primary virtual meeting being the first virtual meeting, wherein modifying the first set of multimedia streams comprises enlarging one or more video streams within the first set of multimedia streams.

5. The system of claim 1, wherein instructions to modify the one or more of the first set of multimedia streams or the second set of multimedia streams based on the primary virtual meeting further causes the processor to execute further processor-executable instructions stored in the non-transitory computer-readable medium to:
   modify the first set of multimedia streams based on the primary virtual meeting being the first virtual meeting, wherein modifying the first set of multimedia streams comprises increasing a volume associated with one or more audio streams within the first set of multimedia streams.

6. The system of claim 1, wherein:
   the primary virtual meeting is determined to be the first virtual meeting;
   and
   the processor is further configured to execute further processor-executable instructions stored in the non-transitory computer-readable medium to:
   transmit, from the first client device, a first audio stream to the first virtual meeting and a second audio stream to the second virtual meeting; and
   mute the second audio stream.

7. The system of claim 1, wherein:
the primary virtual meeting is determined to be the first virtual meeting; and
the processor is further configured to execute further processor-executable instructions stored in the non-transitory computer-readable medium to:
transmit, from the first client device, a first video stream to the first virtual meeting and a second video stream to the second virtual meeting; and
modify one or more video settings associated with the second video stream.

8. The system of claim 1, wherein the instructions to determine, based on the input from the first client device, the primary virtual meeting further cause the processor to execute further processor-executable instructions stored in the non-transitory computer-readable medium to:
detect a selection of the first virtual meeting; and
determine, based on the selection of the first virtual meeting, that the first virtual meeting is the primary virtual meeting.

9. The system of claim 1, wherein the instructions further cause the processor to execute further processor-executable instructions stored in the non-transitory computer-readable medium to:
perform speech recognition on an audio stream from the first set of multimedia streams to identify one or more recognized words; and
identify, based on the one or more recognized words, one or more keywords corresponding to an attention cue.

10. The system of claim 9, wherein the instructions further cause the processor to execute further processor-executable instructions stored in the non-transitory computer-readable medium to:
identify the attention cue; and
provide an alert, to the first client device, based on the attention cue.

11. A method comprising:
joining, by a first client device, a first virtual meeting hosted by a virtual conference provider and having a first plurality of participants;
joining, by the first client device, a second virtual meeting hosted by the virtual conference provider and having a second plurality of participants, the second virtual meeting concurrent with the first virtual meeting;
receiving, from a first client device, a first request to join the first virtual meeting and a second request to join the second virtual meeting;
receive from the virtual conference provider:
a first set of multimedia streams corresponding to the first virtual meeting; and
a second set of multimedia streams corresponding to the second virtual meeting,
wherein the first and second sets of multimedia streams comprise one or more of an audio stream or a video stream;
determining, by the first client device, a primary virtual meeting based on an input, wherein the primary virtual meeting is one of the first virtual meeting or the second virtual meeting;
outputting a replay cue associated with the primary virtual meeting; and
modifying, by the first client device, one or more of the first set of multimedia streams or the second set of multimedia streams based on the primary virtual meeting.

12. The method of claim 11, wherein the method further comprises:
determining an attention cue in at least one of the first set of multimedia streams or the second set of multimedia streams; and
outputting an alert based on the attention cue.

13. The method of claim 12, wherein the method further comprises:
determining the primary virtual meeting based on the attention cue.

14. The method of claim 12, wherein determining the attention cue in at least one of the first set of multimedia streams or the second set of multimedia streams comprises:
performing speech recognition on at least one of the first set of multimedia streams or the second set of multimedia streams; and
determining one or more keywords based on the speech recognition, wherein the one or more keywords correspond to the attention cue.

15. The method of claim 11, wherein:
determining the primary virtual meeting based on the input comprises:
determining, based on a first audio stream captured by the first client device, that the primary virtual meeting is the first virtual meeting; and
modifying one or more of the first set of multimedia streams or the second set of multimedia streams based on the primary virtual meeting comprises:
modifying one or more audio streams within the second set of multimedia streams based on the primary virtual meeting being the first virtual meeting.

16. The method of claim 11, the method further comprising:
transmitting a request to join one or more participants from the second virtual meeting into the first virtual meeting, wherein the one or more participants are not part of the first virtual meeting; and
wherein the virtual conference provider joins the one or more participants from the second virtual meeting into the first virtual meeting.

17. The method of claim 11, wherein the first set of multimedia streams comprises a first chat channel, and the second set of multimedia streams comprises a second chat channel, and the method further comprises:
transmitting a request to add a first participant from the first virtual meeting and a second participant from the second virtual meeting to a third chat channel;
receiving an identification of a third chat channel; and
joining the first client device to the third chat channel.

18. A non-transitory computer-readable medium comprising processor-executable instructions configured to cause one or more processors to:
join, by a first client device, a first virtual meeting hosted by a virtual conference provider and having a first plurality of participants;
join, by the first client device, a second virtual meeting hosted by the virtual conference provider and having a second plurality of participants, the second virtual meeting concurrent with the first virtual meeting;
receive from the virtual conference provider:
a first set of multimedia streams corresponding to the first virtual meeting; and
a second set of multimedia streams corresponding to the second virtual meeting,
wherein the first and second sets of multimedia streams comprise one or more of an audio stream or a video stream;

determine, based on an input, a primary virtual meeting, wherein the primary virtual meeting is one of the first virtual meeting or the second virtual meeting;

output a replay cue associated with the primary virtual meeting; and modify one or more of the first set of multimedia streams or the second set of multimedia streams based on the primary virtual meeting.

19. The non-transitory computer-readable medium of claim 18, wherein the processor is configured to execute further processor-executable instructions stored in the non-transitory computer-readable medium to:

identify an attention cue in an audio stream from the first set of multimedia streams corresponding to the first virtual meeting; and generate an alert based on the attention cue identified in the audio stream from the first set of multimedia streams.

20. The non-transitory computer-readable medium of claim 19, wherein the processor is configured to execute further processor-executable instructions stored in the non-transitory computer-readable medium to:

perform speech recognition on the audio stream from the first set of multimedia streams to identify one or more recognized words; and identify, based on the one or more recognized words, one or more keywords corresponding to the attention cue.

21. The non-transitory computer-readable medium of claim 19, wherein the processor is configured to execute further processor-executable instructions stored in the non-transitory computer-readable medium to:

responsive to generating the alert based on the attention cue automatically provide instructions to modify a volume of the second set of multimedia streams corresponding to the second virtual meeting to the first client device.

22. The non-transitory computer-readable medium of claim 19, wherein the attention cue comprises personally identifiable information corresponding to a participant associated with the first client device and comprises at least one of:

a name of the participant;
a project involving the participant;
a company corresponding to the participant; or
a location corresponding to the participant.

* * * * *